United States Patent
Azuma et al.

(10) Patent No.: US 10,822,516 B2
(45) Date of Patent: Nov. 3, 2020

(54) WATER-BASED COATING COMPOSITION, METHOD FOR FORMING MULTI-LAYER COATING FILM, AND ARTICLE HAVING MULTI-LAYER COATING FILM

(71) Applicant: KANSAI PAINT CO., LTD., Amagasaki-shi, Hyogo (JP)

(72) Inventors: Tatsuya Azuma, Hiratsuka (JP); Narihito Nakano, Hiratsuka (JP)

(73) Assignee: KANSAI PAINT CO., LTD., Amagasaki (JP)

( * ) Notice: Subject to any disclaimer, the term of this patent is extended or adjusted under 35 U.S.C. 154(b) by 74 days.

(21) Appl. No.: 15/489,094

(22) Filed: Apr. 17, 2017

(65) Prior Publication Data

US 2017/0216882 A1    Aug. 3, 2017

Related U.S. Application Data

(62) Division of application No. 14/403,198, filed as application No. PCT/JP2013/064518 on May 24, 2013, now abandoned.

(30) Foreign Application Priority Data

May 24, 2012 (JP) ................................. 2012-118233

(51) Int. Cl.
| | |
|---|---|
| B05D 7/04 | (2006.01) |
| C09D 147/00 | (2006.01) |
| C09D 7/40 | (2018.01) |
| C09D 175/04 | (2006.01) |
| C09D 133/00 | (2006.01) |
| C09D 5/00 | (2006.01) |
| C08G 18/79 | (2006.01) |
| C08F 265/06 | (2006.01) |
| C09D 5/02 | (2006.01) |
| C08G 18/62 | (2006.01) |
| C08G 18/80 | (2006.01) |
| C09D 167/02 | (2006.01) |
| B05D 1/36 | (2006.01) |
| B05D 3/02 | (2006.01) |
| B05D 3/10 | (2006.01) |
| B05D 7/14 | (2006.01) |
| B05D 7/00 | (2006.01) |
| B32B 27/36 | (2006.01) |

(52) U.S. Cl.
CPC ............ *C09D 147/00* (2013.01); *B05D 1/36* (2013.01); *B05D 3/0254* (2013.01); *B05D 3/10* (2013.01); *B05D 7/14* (2013.01); *B05D 7/542* (2013.01); *B05D 7/572* (2013.01); *B32B 27/36* (2013.01); *C08F 265/06* (2013.01); *C08G 18/6254* (2013.01); *C08G 18/792* (2013.01); *C08G 18/8064* (2013.01); *C08G 18/8093* (2013.01); *C09D 5/00* (2013.01); *C09D 5/02* (2013.01); *C09D 5/024* (2013.01); *C09D 7/40* (2018.01); *C09D 133/00* (2013.01); *C09D 167/02* (2013.01); *C09D 175/04* (2013.01); *B05D 7/582* (2013.01); *Y10T 428/254* (2015.01)

(58) Field of Classification Search
CPC . B05D 7/50; B05D 7/54; B05D 7/536; B05D 7/546; B05D 7/572; C09D 175/00; C09D 177/00
USPC ........ 524/507, 591, 839, 840; 525/123, 455; 427/372.2, 385.5, 407.1; 428/423.1
See application file for complete search history.

(56) References Cited

U.S. PATENT DOCUMENTS

| | | | |
|---|---|---|---|
| 6,696,539 B2 | 2/2004 | Kobata et al. | |
| 8,580,385 B2 * | 11/2013 | Kitagawa | ............... B05D 7/572 427/407.1 |
| 8,758,896 B2 * | 6/2014 | Imanaka | .................. B05D 7/14 427/384 |
| 9,017,768 B2 | 4/2015 | Tomizaki et al. | |
| 2002/0165335 A1 | 11/2002 | Kobata et al. | |

(Continued)

FOREIGN PATENT DOCUMENTS

| | | |
|---|---|---|
| JP | 10-216617 A | 8/1998 |
| JP | 2002-35678 A | 2/2002 |

(Continued)

OTHER PUBLICATIONS

International Search Report dated Jul. 9, 2013 issued in corresponding PCT/JP2013/064518 application (pp. 1-2).

(Continued)

*Primary Examiner* — Gregory R Delcotto
(74) *Attorney, Agent, or Firm* — Millen White Zelano and Branigan, PC; John Sopp

(57) ABSTRACT

A water-based coating composition and method for forming a multi-layer coating film by which it is possible to form a coating film 5 having excellent smoothness, image clarity, and chipping resistance in a 3C1B format. The composition is characterized by containing 7 to 60 mass % of an acrylic resin emulsion (a), 10 to 60 mass % of a film-forming resin (b), and 10 10 to 50 mass % of a curing agent (c), on the basis of the total mass of the solid resin content in the composition; the acrylic resin emulsion (a) having a core/shell structure where the core section contains, as a copolymer component, 0.1 to 10 mass % of a polymerizable unsaturated 15 monomer having two or more polymerizable unsaturated groups in one molecule, on the basis of the total mass of monomer of the core section, and the hydroxyl value of the core section is 50 to 200 mgKOH/g, and the hydroxyl value of the shell section is 50 to 200 mgKOH/g.

6 Claims, No Drawings

(56) References Cited

U.S. PATENT DOCUMENTS

| | | |
|---|---|---|
| 2004/0134791 A1 | 7/2004 | Toi et al. |
| 2007/0237903 A1 | 10/2007 | Hiwara et al. |
| 2009/0041942 A1 | 2/2009 | Hayashi et al. |
| 2009/0075063 A1 | 3/2009 | Iida et al. |
| 2011/0111242 A1 | 5/2011 | Tomizaki et al. |
| 2011/0300389 A1* | 12/2011 | Kitagawa ............... B05D 7/572 428/423.1 |
| 2012/0107619 A1* | 5/2012 | Kitagawa ............... C08G 18/44 428/423.1 |
| 2014/0030528 A1 | 1/2014 | Kitagawa et al. |
| 2014/0031484 A1 | 1/2014 | Kobata et al. |

FOREIGN PATENT DOCUMENTS

| | | |
|---|---|---|
| JP | 2002-322238 A | 11/2002 |
| JP | 2003-253211 A | 9/2003 |
| JP | 2011-525415 A | 9/2011 |
| WO | 2004/061025 A1 | 7/2004 |
| WO | 2006/009219 A1 | 1/2006 |
| WO | 2007/013558 A1 | 2/2007 |
| WO | 2007/043633 A2 | 4/2007 |
| WO | 2009/157588 A1 | 12/2009 |
| WO | 2011/099639 A1 | 8/2011 |
| WO | 2012/002569 A1 | 1/2012 |
| WO | WO2012/002569 * | 1/2012 |
| WO | 2012/137881 A1 | 10/2012 |
| WO | 2012/137884 A1 | 10/2012 |
| WO | 2013/027093 A1 | 2/2013 |

OTHER PUBLICATIONS

English Translation Abstract of JP 10-216617 published Aug. 18, 1998.
English Translation Abstract of JP 2002-035678 published Feb. 5, 2002.
English Translation Abstract of JP 2003-253211 published Sep. 10, 2003.
English Translation Abstract of WO 2011/099639 published Aug. 18, 2011.
English Language Machine Translation of WO2011/099639.
English Language Machine Translation of WO2007/013558.

* cited by examiner

WATER-BASED COATING COMPOSITION, METHOD FOR FORMING MULTI-LAYER COATING FILM, AND ARTICLE HAVING MULTI-LAYER COATING FILM

TECHNICAL FIELD

The present invention relates to a water-based coating composition to be used as a water-based first pigmented coating material in a 3-coat, 1-bake system in which a water-based first pigmented coating material, a water-based second pigmented coating material and a clear coating material are coated in that order on an article to be coated, and the obtained 3-layer multilayer coating film is simultaneously heat cured, as well as to a multilayer coating film-forming method and an article with a multilayer coating film.

BACKGROUND ART

As a method of forming coating films for automobile bodies, there is widely employed a method of forming a multilayer coating film by a 3-coat, 2-bake (3C2B) system in which an electrodeposition coating is formed on an article to be coated, and this is followed by "intercoat material application, bake curing, base coat material application, clear coating material application and bake curing", in that order. In recent years, from the viewpoint of achieving energy savings, it has also been attempted to employ 3-coat, 1-bake (3C1B) systems that eliminate the bake curing step following application of the intercoat material, wherein electrodeposition coating is carried out on an article to be coated, followed by "intercoat material application, base coat material application, clear coating material application and bake curing", in that order (PTL 1, for example).

However, with 3C1B systems there is an issue of proneness to layer mixing between the intercoating film and base coating film, which can lower the smoothness and distinctness of image of the obtained coating film.

Also, automobile coating films are expected to have excellent damage resistance ("chipping resistance") against damage by rocks and the like during travel, and as water-based intercoat materials with excellent chipping resistance there have hitherto been proposed, for example, water-based intercoat material compositions comprising a specific talc and silane coupling agent (PTL 2, for example).

In PTL 3 there is described, as an intercoat material in a 3-coat, 1-bake system, the use of a water-based intercoat material composition comprising a copolymer resin emulsion obtained by emulsion polymerization of a monomer (a) including at least one type of monomer selected from among alkyl (meth)acrylate esters, and if necessary at least one type monomer selected from the group consisting of styrene-based monomers, (meth)acrylonitrile and (meth)acrylamide, an acid group-containing polymerizable unsaturated monomer (b), a hydroxyl group-containing polymerizable unsaturated monomer (c) and a crosslinkable monomer (d), the copolymer resin emulsion having a glass transition temperature (Tg) of −50° C. to 20° C., an acid value of 2 to 60 mgKOH/g and a hydroxyl value of 10 to 120 mgKOH/g, and a curing agent, whereby curing reactivity between the copolymer resin emulsion and the curing agent is increased, and a multilayer coating film with satisfactory chipping resistance and water resistance and a good finished appearance can be formed.

CITATION LIST

Patent Literature

PTL 1 Japanese Unexamined Patent Publication HEI No. 10-216617
PTL 2 Japanese Unexamined Patent Publication No. 2003-253211
PTL 3 International Patent Publication No. WO2004/061025

SUMMARY OF INVENTION

Technical Problems

At the current time, however, it has not been possible to obtain a coating composition and multilayer coating film-forming method that are fully satisfactory in terms of all the properties of chipping resistance, water resistance, smoothness and distinctness of image.

It is therefore an object of the present invention to provide a water-based coating composition and a multilayer coating film-forming method that allow formation of a coating film with excellent smoothness, distinctness of image and chipping resistance, by a 3C1B system.

Solution to Problems

As a result of diligent research aimed at achieving the object stated above, the present inventors have completed this invention upon finding that, in a coating process for a multilayer coating film by a 3C1B system, it is possible to form a multilayer coating film with excellent chipping properties, smoothness and distinctness of image by using as the water-based first pigmented coating material a coating material comprising a specific acrylic resin emulsion (a), a coating film-forming resin (b) and a crosslinking agent (c).

In other words, the invention provides a water-based coating composition, a multilayer coating film-forming method and an article with a multilayer coating film, as follows.

1. A water-based coating composition to be used as a water-based first pigmented coating material (A) in a multilayer coating film-forming method in which the following steps (1) to (4) are carried out in order: step (1): a step of coating an article to be coated with a water-based first pigmented coating material (A) to form a first pigmented coating film, step (2): a step of coating the uncured first pigmented coating film formed in step (1) with a water-based second pigmented coating material (B) to form a second pigmented coating film, step (3): a step of coating the uncured second pigmented coating film formed in step (2) with a clear coating material (C) to form a clear coating film, and step (4): a step of bake curing the multilayer coating film formed in steps (1) to (3), wherein:

the water-based coating composition comprises 7 to 60 mass % of an acrylic resin emulsion (a), 10 to 60 mass % of a coating film-forming resin (b) and 10 to 50 mass % of a curing agent (c), based on the total mass of the solid resin content in the water-based coating composition, the acrylic resin emulsion (a) has a core-shell structure, the core section comprising, as a copolymerizing component, 0.1 to 10 mass % of a polymerizable unsaturated monomer having two or more polymerizable unsaturated groups in the molecule, based on the total mass of the monomers of the core section, and the hydroxyl value of the core section is 50 to 200 mgKOH/g and the hydroxyl value of the shell section is 50 to 200 mgKOH/g.

2. A water-based coating composition according to 1. above, wherein the core section comprises, as a copolymerizing component, 30 to 90 mass % of a copolymerizable unsaturated monomer with a C4 or greater hydrocarbon group, based on the total mass of the monomers of the core section, the acid value of the acrylic resin emulsion (a) is 5 to 25 mgKOH/g, and its glass transition temperature (Tg) is 20° C. or higher.

3. A water-based coating composition according to 1. or 2. above, wherein the coating film-forming resin (b) comprises at least one type selected from among polyester resins (b1), water-soluble acrylic resins (b2) and urethane resins (b3).

4. A water-based coating composition according to any one of 1. to 3. above, wherein the curing agent (c) comprises an amino resin (c1) and/or a blocked polyisocyanate compound (c2), and the water-based coating composition includes 5 to 30 mass % of an amino resin (c1) and/or 5 to 30 mass % of a blocked polyisocyanate compound (c2), based on the total mass of the solid resin content in the water-based coating composition.

5. A water-based coating composition according to any one of 1. to 4. above, wherein the blocked polyisocyanate compound (c2) comprises an active methylene-type blocked polyisocyanate compound (c3) with at least one type of blocked isocyanate group selected from the group consisting of blocked isocyanate groups represented by the following formula (I):

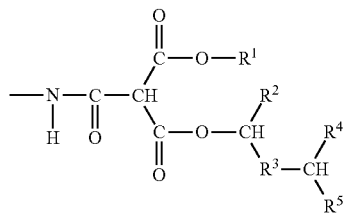

(I)

(wherein $R^1$, $R^2$, $R^4$ and $R^5$ each independently represent a C1-12 hydrocarbon group and $R^3$ represents a C1-12 straight-chain or branched alkylene group), blocked isocyanate groups represented by the following formula (II):

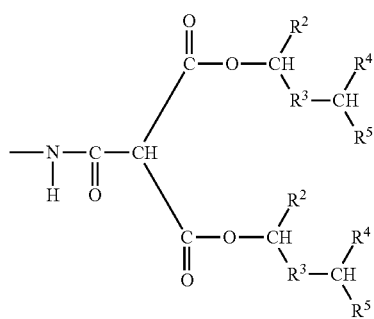

(II)

(wherein $R^2$, $R^3$, $R^4$ and $R^5$ have the same definitions as above),
and blocked isocyanate groups represented by the following formula (III):

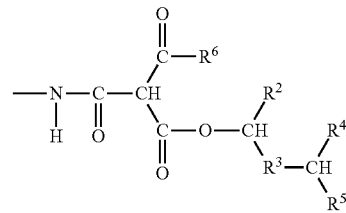

(III)

(wherein $R^2$, $R^3$, $R^4$ and $R^5$ have the same definitions as above, and $R^6$ represents a C1-12 hydrocarbon group).

6. A water-based coating composition according to any one of 1. to 5. above, wherein the water-based coating composition includes, as a pigment, titanium dioxide and/or barium sulfate in a total range of 50 to 150 mass % based on the total mass of the solid resin content.

7. A multilayer coating film-forming method comprising the following steps (1) to (4):

step (1): a step of coating an article to be coated with a water-based first pigmented coating material (A) to form a first pigmented coating film, step (2): a step of coating the uncured first pigmented coating film formed in step (1) with a water-based second pigmented coating material (B) to form a second pigmented coating film, step (3): a step of coating the uncured second pigmented coating film formed in step (2) with a clear coating material (C) to form a clear coating film, and step (4): a step of bake curing the multilayer coating film formed in steps (1) to (3), wherein the water-based coating composition as the water-based first pigmented coating material (A) comprises 7 to 60 mass % of an acrylic resin emulsion (a), 10 to 60 mass % of a coating film-forming resin (b) and 10 to 50 mass % of a curing agent (c), based on the total mass of the solid resin content in the water-based coating composition, the acrylic resin emulsion (a) has a core-shell structure, the core section comprising, as a copolymerizing component, 0.1 to 10 mass % of a polymerizable unsaturated monomer having two or more polymerizable unsaturated groups in the molecule, based on the total mass of the monomers of the core section, and the hydroxyl value of the core section is 50 to 200 mgKOH/g and the hydroxyl value of the shell section is 50 to 200 mgKOH/g.

8. The method according to 7. above, wherein the core section comprises, as a copolymerizing component, 30 to 90 mass % of a copolymerizable unsaturated monomer with a C4 or greater hydrocarbon group, based on the total mass of the monomers of the core section, the acid value of the acrylic resin emulsion (a) is no greater than 15 mgKOH/g, and its glass transition temperature (Tg) is 20° C. or higher.

9. An article with a multilayer coating film, formed by the method according to 7. or 8. above.

Advantageous Effect of Invention

With the water-based coating composition of the invention it is possible to form a multilayer coating film with excellent smoothness, distinctness of image and chipping resistance by a 3C1B system.

DESCRIPTION OF EMBODIMENTS

The water-based coating composition of the invention is a water-based coating composition to be used as a water-based first pigmented coating material (A) in a multilayer coating film-forming method in which the following steps (1) to (4) are carried out in order: step (1): a step of coating an article to be coated with a water-based first pigmented coating material (A) to form a first pigmented coating film, step (2): a step of coating the uncured first pigmented coating film formed in step (1) with a water-based second pigmented coating material (B) to form a second pigmented coating film, step (3): a step of coating the uncured second pigmented coating film formed in step (2) with a clear coating material (C) to form a clear coating film, and step (4): a step of bake curing the multilayer coating film formed in steps (1) to (3), wherein the water-based coating composition comprises 7 to 60 mass % of an acrylic resin emulsion (a), 10 to 60 mass % of a coating film-forming resin (b) and 10 to 50 mass % of a curing agent (c), based on the total mass of the solid resin content in the water-based coating composition, the acrylic resin emulsion (a) has a core-shell structure, the core section comprising, as a copolymerizing component, 0.1 to 10 mass % of a polymerizable unsaturated monomer having two or more polymerizable unsaturated groups in the molecule, based on the total mass of the monomers of the core section, and the hydroxyl value of the core section is 50 to 200 mgKOH/g and the hydroxyl value of the shell section is 50 to 200 mgKOH/g.

[Acrylic Resin Emulsion (a)]

The acrylic resin emulsion (a) to be used in the water-based coating composition of the invention has a core-shell structure including a core section and a shell section, and is preferably produced by two-stage polymerization in an aqueous medium. Also, in acrylic resin emulsion (a), the proportion of copolymer (I) composing the core section (hereunder also referred to as "core section copolymer (I)") and copolymer (II) composing the shell section (hereunder also referred to as "shell section copolymer (II)") is preferably in the range of about 10/90 to 90/10, as the solid mass ratio.

[Polymerizable Unsaturated Monomer (m) Forming Acrylic resin emulsion (a)]

There are no particular restrictions on the polymerizable unsaturated monomer used to form the acrylic resin emulsion (a), and for example, the following compounds with polymerizable unsaturated groups, (m-1) to (m-5), may be mentioned.

As used herein, "polymerizable unsaturated group" means an unsaturated group that can participate in radical polymerization. Examples of such polymerizable unsaturated groups include vinyl and (meth)acryloyl.

Also, "(meth)acrylate" means "acrylate or methacrylate", "(meth)acrylic acid" means "acrylic acid or methacrylic acid", "(meth)acryloyl" means "acryloyl or methacryloyl" and "(meth)acrylamide" means "acrylamide or methacrylamide".

[Polymerizable Unsaturated Monomer with Two or More Polymerizable Unsaturated Groups in the Molecule (m-1)]

Specific examples for the polymerizable unsaturated monomer with two or more polymerizable unsaturated groups in the molecule (m-1) include allyl (meth)acrylate, ethyleneglycol di(meth)acrylate, triethyleneglycol di(meth)acrylate, tetraethyleneglycol di(meth)acrylate, 1,3-butyleneglycol di(meth)acrylate, trimethylolpropane tri(meth)acrylate, 1,4-butanediol di(meth)acrylate, neopentyl glycol di(meth)acrylate, 1,6-hexanediol di(meth)acrylate, methylene bis(meth)acrylamide, ethylene bis(meth)acrylamide, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate and divinylbenzene.

Also, the polymerizable unsaturated monomer with two or more polymerizable unsaturated groups in the molecule (m-1) includes combinations of two or more different polymerizable unsaturated monomers with mutually reactive functional groups (m-11). This is because a combination of two or more different polymerizable unsaturated monomers with mutually reactive functional groups (m-11), by undergoing mutual reaction before copolymerization, during copolymerization and/or after copolymerization of the acrylic resin emulsion (a), has the same function as a polymerizable unsaturated monomer with two or more polymerizable unsaturated groups in the molecule (m-1), i.e. the function of crosslinking the core section. The combination of the functional groups used may be any combination of functional groups that are mutually reactive, but a combination of an acidic group and a glycidyl group, an amino group and a glycidyl group or a hydroxyl group and an isocyanate group is preferred.

Specific examples of combinations of two or more different polymerizable unsaturated monomers with mutually reactive functional groups (m-11) include combinations of (meth)acrylic acid and glycidyl (meth)acrylate, (meth)acryloyloxyalkyl acid phosphates and glycidyl (meth)acrylate, (di)alkylaminoethyl (meth)acrylates and glycidyl (meth)acrylate and hydroxyalkyl (meth)acrylates and (meth)acryloyloxyalkyl isocyanate, any of which may be used alone or in combination of two or more.

Also, the polymerizable unsaturated monomer with two or more polymerizable unsaturated groups in the molecule (m-1) includes combinations of polymerizable unsaturated monomers with a reactive functional group and compounds with two or more functional groups that can react with the reactive functional group (m-12). This is because a combination of a polymerizable unsaturated monomer with a reactive functional group and a compound with two or more functional groups that can react with the reactive functional group (m-12), by undergoing mutual reaction before copolymerization, during copolymerization and/or after copolymerization of the acrylic resin emulsion (a), has the same function as a polymerizable unsaturated monomer with two or more polymerizable unsaturated groups in the molecule (m-1), i.e. the function of crosslinking the core section.

Examples of combinations of a polymerizable unsaturated monomer with a reactive functional group and a compound with two or more functional groups that can react with the reactive functional group (m-12) include glycidyl group-containing polymerizable unsaturated monomers and polybasic acid components, and hydroxyl group-containing polymerizable unsaturated monomers and polyfunctional isocyanate compounds. Specific examples include combinations of glycidyl (meth)acrylate and adipic acid and hydroxyalkyl (meth)acrylate and hexamethylene diisocyanate, which may be used alone or in combinations of two or more.

[Hydroxyl Group-Containing Polymerizable Unsaturated Monomer (m-2)]

Specific examples for the hydroxyl group-containing polymerizable unsaturated monomer (m-2) include monoesterified products of (meth)acrylic acid and C2-8 dihydric alcohols, such as 2-hydroxyethyl (meth)acrylate, 2-hydroxypropyl (meth)acrylate, 3-hydroxypropyl (meth)acrylate and 4-hydroxybutyl (meth)acrylate, ε-caprolactone-modified forms of the monoesterified products of (meth)acrylic acid and C2-8 dihydric alcohols, N-hydroxymethyl (meth)acrylamide; allyl alcohols, and (meth)acrylates having polyoxyalkylene chains with hydroxyl group molecular ends.

[Copolymerizable Unsaturated Monomer with C4 or Greater Hydrocarbon Group (m-3)]

The polymerizable unsaturated monomer with a C4 or greater hydrocarbon group (m-3) is a polymerizable unsaturated monomer having a C4 or greater straight-chain, branched or cyclic saturated or unsaturated hydrocarbon group, excluding monomers having hydrophilic groups such as hydroxyl group-containing polymerizable unsaturated monomers. Specific examples of such monomers include alkyl or cycloalkyl (meth)acrylates such as n-butyl (meth)acrylate, isobutyl (meth)acrylate, tert-butyl (meth)acrylate, n-hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate and tricyclodecanyl (meth)acrylate; polymerizable unsaturated compounds with isobornyl groups such as isobornyl (meth)acrylate; polymerizable unsaturated compounds with adamantyl groups such as adamantyl (meth)acrylate; aromatic ring-containing polymerizable unsaturated monomers such as benzyl (meth)acrylate, styrene, α-methylstyrene and vinyltoluene.

[Carboxyl Group-Containing Polymerizable Unsaturated monomer (m-4)]

Specific examples for the carboxyl group-containing polymerizable unsaturated monomer (m-4) include (meth)acrylic acid, maleic acid, crotonic acid and β-carboxyethyl acrylate.

[Polymerizable Unsaturated Monomer (m-5) Other than (m-1) to (m-4)]

Examples for the polymerizable unsaturated monomer (m-5) other than (m-1) to (m-4) include ≤C3 alkyl (meth)acrylates such as methyl (meth)acrylate, ethyl (meth)acrylate, n-propyl (meth)acrylate and isopropyl (meth)acrylate; nitrogen-containing polymerizable unsaturated monomers containing no urethane bonds, such as (meta)acrylonitrile, (meth)acrylamide, N,N-dimethylaminoethyl (meth)acrylate, N,N-diethylaminoethyl (meth)acrylate, N,N-dimethylaminopropyl (meth)acrylamide and addition products of glycidyl (meth)acrylate and amines; polymerizable unsaturated monomers with urethane bonds; epoxy group-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allyl glycidyl ether; (meth)acrylates with polyoxyethylene chains having alkoxy groups at the molecular ends; polymerizable unsaturated monomers with sulfonic acid groups, such as 2-acrylamide-2-methylpropanesulfonic acid, 2-sulfoethyl (meth)acrylate, allylsulfonic acid and 4-styrenesulfonic acid, as well as sodium salts and ammonium salts of these sulfonic acids; polymerizable unsaturated monomers with alkoxysilyl groups, such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; perfluoroalkyl (meth)acrylates such as perfluorobutylethyl (meth)acrylate and perfluorooctylethyl (meth)acrylate; polymerizable unsaturated monomers with fluorinated alkyl groups, such as fluoroolefins; and polymerizable unsaturated monomers with photopolymerizable functional groups, such as maleimide.

[Core Section Copolymer (I)]

The core section copolymer (I) of the acrylic resin emulsion (a) to be used in the water-based coating composition of the invention comprises a polymerizable unsaturated monomer with two or more polymerizable unsaturated groups in the molecule and a hydroxyl group-containing polymerizable unsaturated monomer, as copolymerizing components.

The polymerizable unsaturated monomer with two or more polymerizable unsaturated groups in the molecule has the function of imparting a crosslinked structure to the core section copolymer (I). The polymerizable unsaturated monomer with two or more polymerizable unsaturated groups in the molecule may be any one or a combination of two or more of the polymerizable unsaturated monomers mentioned as examples for the polymerizable unsaturated monomer with two or more polymerizable unsaturated groups in the molecule (m-1), but from the viewpoint of viscosity and film performance of the coating material that is to be obtained, it is preferred to use methylene bis(meth)acrylamide, allyl (meth)acrylate or ethyleneglycol di(meth)acrylate.

The proportion of the polymerizable unsaturated monomer with two or more polymerizable unsaturated groups in the molecule that is used may be appropriately determined according to the degree of crosslinking of the core section copolymer (I), but for most purposes it is preferably about 0.1 to 10 mass %, more preferably about 0.5 to 8 mass % and even more preferably about 1 to 6 mass %, based on the total mass of monomers that can form the core section copolymer (I).

Also, the hydroxyl group-containing polymerizable unsaturated monomer has the function of improving the chipping resistance and water resistance of the coating film, by introducing hydroxyl groups that undergo crosslinking reaction with the curing agent (c) (that is reactive with hydroxyl groups) into the core section copolymer (I). The hydroxyl group-containing polymerizable unsaturated monomer that is used may be a single one or a combination of two or more of the polymerizable unsaturated monomers mentioned as examples for the hydroxyl group-containing polymerizable unsaturated monomer (m-2), but preferably 2-hydroxyethyl (meth)acrylate, 2-hydroxypropyl (meth)acrylate, 3-hydroxypropyl (meth)acrylate or 4-hydroxybutyl (meth)acrylate is used, and more preferably 2-hydroxyethyl (meth)acrylate is used.

The hydroxyl value of the core section copolymer (I) is preferably about 50 to 200 mgKOH/g, more preferably about 50 to 150 mgKOH/g and even more preferably about 50 to 100 mgKOH/g, from the viewpoint of stability of the acrylic resin emulsion (a) in the aqueous medium and excellent water resistance of the coating film that is to be obtained.

The core section copolymer (I) used may be a polymerizable unsaturated monomer with a C4 or greater hydrocarbon group (m-3) if necessary, in addition to the aforementioned polymerizable unsaturated monomer with two or more polymerizable unsaturated groups in the molecule (m-1) and the aforementioned hydroxyl group-containing polymerizable unsaturated monomer (m-2) from the viewpoint of improving the smoothness and distinctness of image of the coating film that is to be obtained. The polymerizable unsaturated monomer with a C4 or greater hydrocarbon group (m-3) used may be one or a combination of two or more of the monomers mentioned above, for example, and n-butyl (meth)acrylate, isobutyl (meth)acrylate, 2-ethylhexyl (meth)acrylate or styrene is preferably used.

By adding an acrylic resin emulsion (a) copolymerized with the polymerizable unsaturated monomer with a C4 or greater hydrocarbon group (m-3) to the water-based first pigmented coating material (A), it is possible to obtain a first pigmented coating film with lower polarity, and to obtain a multilayer coating film having minimal layer mixing when the water-based second pigmented coating material (B) has been applied onto the uncured first pigmented coating film, and satisfactory smoothness and distinctness of image.

When the core section includes a copolymerizable unsaturated monomer with a C4 or greater hydrocarbon group as a copolymerizing component, the proportion of the polymerizable unsaturated monomer with a C4 or greater hydrocarbon group (m-3) that is used is preferably 30 to 90 mass %, more preferably about 35 to 85 mass % and even more preferably about 40 to 80 mass %, based on the total mass of the monomer composing the core section copolymer (I), from the viewpoint of smoothness and distinctness of image of the multilayer coating film that is to be obtained.

The polymerizable unsaturated monomer to be used as a monomer for the core section copolymer (I) is not particularly restricted, other than that the polymerizable unsaturated monomers (m-1) and (m-2) are essential components, and for example, any of those mentioned for the polymerizable unsaturated monomer (m) composing the acrylic resin emulsion (a) may be suitably used, as necessary. In addition to the polymerizable unsaturated monomer with two or more polymerizable unsaturated groups in the molecule (m-1), the hydroxyl group-containing polymerizable unsaturated monomer (m-2) and the polymerizable unsaturated monomer with a C4 or greater hydrocarbon group (m-3), other examples include methyl (meth)acrylate, ethyl (meth)acrylate, n-propyl (meth)acrylate and isopropyl (meth)acrylate. These monomers may be used alone or in combinations of two or more.

[Shell Section Copolymer (II)]

The shell section copolymer (II) of the acrylic resin emulsion (a) to be used in the water-based coating composition of the invention preferably comprises a hydroxyl group-containing polymerizable unsaturated monomer as a copolymerizing component.

The hydroxyl group-containing polymerizable unsaturated monomer has the function of improving the water resistance of the coating film that is to be formed, and of improving the stability of the acrylic resin emulsion (a) in the aqueous medium, by introducing a hydroxyl group that undergoes crosslinking reaction with the curing agent (c) (that is reactive with hydroxyl groups) into the acrylic resin emulsion (a).

The hydroxyl group-containing polymerizable unsaturated monomer that is used may be a single one or a combination of two or more of the polymerizable unsaturated monomers mentioned as examples for the hydroxyl group-containing polymerizable unsaturated monomer (m-2), but preferably 2-hydroxyethyl (meth)acrylate, 2-hydroxypropyl (meth)acrylate, 3-hydroxypropyl (meth)acrylate or 4-hydroxybutyl (meth)acrylate is used, and more preferably 2-hydroxyethyl (meth)acrylate is used.

The hydroxyl value of the shell section copolymer (II) is preferably about 50 to 200 mgKOH/g, more preferably about 50 to 150 mgKOH/g and even more preferably about 50 to 100 mgKOH/g, from the viewpoint of stability of the acrylic resin in the aqueous medium and excellent water resistance of the coating film that is to be obtained.

The shell section copolymer (II) may also optionally include a carboxyl group-containing polymerizable unsaturated monomer as a copolymerizing component. The carboxyl group-containing polymerizable unsaturated monomer has the function of improving the stability of the acrylic resin emulsion (a) that is to be obtained, in the aqueous medium. The carboxyl group-containing polymerizable unsaturated monomer used may suitably be one or a combination of two or more of the polymerizable unsaturated monomers mentioned above for the carboxyl group-containing polymerizable unsaturated monomer (m-4), but it is preferred to use (meth)acrylic acid.

From the viewpoint of the smoothness and distinctness of image of the coating film that is to be obtained, the polymerizable unsaturated monomer to be used as the monomer for the shell section copolymer (II) is preferably not a polymerizable unsaturated monomer with two or more polymerizable unsaturated groups in the molecule (m-1), so that the copolymer (II) is non-crosslinked.

The polymerizable unsaturated monomer to be used as a monomer for the shell section copolymer (II) is not particularly restricted, other than that the monomer (m-2) is an essential component, and for example, any of those mentioned for the polymerizable unsaturated monomer (m) composing the acrylic resin emulsion (a) may be suitably used, as necessary. In addition to the hydroxyl group-containing polymerizable unsaturated monomer (m-2) and the carboxyl group-containing polymerizable unsaturated monomer (m-4), examples include methyl (meth)acrylate, ethyl (meth)acrylate, n-propyl (meth)acrylate, isopropyl (meth)acrylate and n-butyl (meth)acrylate. These monomers may be used alone or in combinations of two or more.

The core section copolymer (I)/shell section copolymer (II) ratio in the acrylic resin emulsion (a) is preferably about 10/90 to 90/10, more preferably about 50/50 to 85/15 and even more preferably about 65/35 to 80/20 as the solid mass ratio, from the viewpoint of improving the brightness of the coating film.

From the viewpoint of the storage stability of the coating material and the smoothness, distinctness of image and water resistance of the coating film that is to be obtained, the acrylic resin emulsion (a) has an acid value of preferably about 5 to 25 mgKOH/g, more preferably about 8 to 20 mgKOH/g and even more preferably about 10 to 15 mgKOH/g.

The acrylic resin emulsion (a) has a glass transition temperature (Tg) of preferably 20° C. or higher, more preferably about 21° C. to 100° C. and even more preferably about 22° C. to 60° C., for the smoothness and distinctness of image of the multilayer coating film.

According to the invention, the glass transition temperature Tg is the value calculated by the following formula.

$$1/Tg(K) = W_1/T_1 + W_2/T_2 + \ldots W_n/T_n$$

$$Tg(° C.) = Tg(K) - 273$$

In the formula, $W_1$, $W_2$ ... $W_n$ represents the mass fraction of each monomer, and $T_1$, $T_2$ ... $T_n$ represents the glass transition temperature Tg(K) of a homopolymer of each monomer.

The glass transition temperature of the homopolymer of each monomer is the value according to Polymer Handbook Fourth Edition, J. Brandrup, E. H. Immergut, E. A. Grulke, ed. (1999), and the glass transition temperatures of monomers not listed in this publication are the values measured by synthesizing a homopolymer of the monomer to a weight-average molecular weight of about 50,000, and determining the glass transition temperature with a DSC220U by Seiko Instruments, Inc. (differential scanning calorimeter). The measurement was conducted by weighing out 50 mg of sample into a special sample dish and drying it at 130° C. for 3 hours, and then raising the temperature from −50° C. to 150° C. at a speed of 10° C./min in an inert gas, and reading out the temperature at the point of inflection of the obtained heat change curve.

Emulsion of the core section copolymer (I) can be accomplished by a method known in the prior art, such as emulsion polymerization. For example, the emulsion polymerization can be carried out by emulsion polymerization of the monomer mixture using a polymerization initiator in the presence of an emulsifying agent.

The emulsifying agent is preferably an anionic emulsifying agent or nonionic emulsifying agent. Examples of anionic emulsifying agents include sodium salts and ammonium salts of alkylsulfonic acids, alkylbenzenesulfonic acids and alkylphosphoric acids. Examples of nonionic emulsifiers include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate and polyoxyethylene-sorbitan monolaurate.

There may also be used a polyoxyalkylene group-containing anionic emulsifying agent having an anionic group and a polyoxyalkylene group such as polyoxyethylene or polyoxypropylene in the molecule; or a reactive anionic emulsifying agent having an anionic group and a radical polymerizable unsaturated group in the molecule. Of these it is preferred to use a reactive anionic emulsifying agent.

The reactive anionic emulsifying agent may be a sodium salt of a sulfonic acid compound with a radical polymerizable unsaturated group such as allyl, methallyl, (meth)acryloyl, propenyl or butenyl, or an ammonium salt of such a sulfonic acid compound. Of these, ammonium salts of sulfonic acid compounds with radical polymerizable unsaturated groups are preferred for excellent water resistance of the coating film that is to be obtained. An example of a commercial product that is an ammonium salt of a sulfonic acid compound is "LATEMUL S-180A" (trade name of Kao Corp.).

Among ammonium salts of sulfonic acid compounds with radical polymerizable unsaturated groups, there are preferred ammonium salts of sulfonic acid compounds having radical polymerizable unsaturated groups and polyoxyalkylene groups. Examples of commercial products that are ammonium salts of sulfonic acid compounds with radical polymerizable unsaturated groups and polyoxyalkylene groups include "AQUALON KH-10" (trade name of Daiichi Kogyo Seiyaku Co., Ltd.) and "SR-1025A" (trade name of Adeka Corp.).

The amount of the emulsifying agent used is preferably about 0.1 to 15 mass %, more preferably about 0.5 to 10 mass % and even more preferably about 1 to 5 mass %, based on the total of all of the monomers used.

Examples of polymerization initiators include organic peroxides such as benzoyl peroxide, octanoyl peroxide, lauroyl peroxide, stearoyl peroxide, cumene hydroperoxide, tert-butyl peroxide, tert-butyl peroxylaurate, tert-butylperoxyisopropyl carbonate, tert-butyl peroxyacetate and diisopropylbenzene hydroperoxide; azo compounds such as azobisisobutyronitrile, azobis(2,4-dimethylvaleronitrile), azobis(2-methylpropionitrile), azobis(2-methylbutyronitrile), 4,4'-azobis(4-cyanobutanoic acid), dimethylazobis(2-methyl propionate), azobis[2-methyl-N-(2-hydroxyethyl)-propionamide] and azobis{2-methyl-N-[2-(1-hydroxybutyl)]-propionamide}; and persulfuric acid salts such as potassium persulfate, ammonium persulfate and sodium persulfate. These polymerization initiators may be used either alone or in combinations of two or more. If necessary, a reducing agent such as a sugar, sodium formaldehyde sulfoxylate or an iron complex may be used with the polymerization initiator, for use as a redox initiator.

Generally, the amount of the polymerization initiator used is preferably about 0.1 to 5 mass % and more preferably about 0.2 to 3 mass %, based on the total mass of all of the monomers used. The method of adding the polymerization initiator is not particularly restricted, and it may be appropriately selected according to the type and amount used. For example, it may be mixed with the monomer mixture or aqueous medium beforehand, or it may be added all at once or in a dropwise manner during polymerization.

The acrylic resin emulsion (a) can be obtained by adding the polymerizable unsaturated monomer mixture for the shell section to the obtained emulsion of the core section copolymer (I), and conducting further polymerization to form the shell section copolymer (II).

The monomer mixture that is to form the shell section copolymer (II) may appropriately include components such as polymerization initiators, chain transfer agents, reducing agents, emulsifying agents and the like, as necessary. Also, although the monomer mixture may be added dropwise as is, preferably it is added dropwise as a monomer emulsion obtained by dispersing the monomer mixture in an aqueous medium. The particle diameter of the monomer emulsion in this case is not particularly restricted.

The polymerization method for the monomer mixture that is to form the shell section copolymer (II) may be, for example, a method of adding the monomer mixture or its emulsion to the reaction system either all at once or in a slow dropwise fashion to the emulsion of the core section copolymer (I), and heating to a suitable temperature while stirring.

The acrylic resin emulsion (a) obtained in this manner may have a mean particle diameter generally in the range of about 10 to 1,000 nm, preferably about 40 to 500 nm and most preferably about 70 to 200 nm, for water-dispersibility of the core-shell type multilayer structure.

As used herein the mean particle diameter of the acrylic resin emulsion (a) is the value measured using a submicron particle size distribution analyzer at 20° C., after dilution with deionized water by a common method. As an example of a submicron particle size distribution analyzer, there may be used a "COULTER N4" (trade name of Beckman Coulter, Inc.).

When the acrylic resin emulsion (a) has an acidic group such as a carboxyl group, it is preferred to neutralize the acidic group of the acrylic resin emulsion (a) with a neutralizing agent, in order to improve the mechanical stability of the acrylic resin emulsion (a) particles. There are no particular restrictions on the neutralizing agent so long as it can neutralize the acidic groups, and examples include sodium hydroxide, potassium hydroxide, trimethylamine, 2-(dimethylamino)ethanol, 2-amino-2-methyl-1-propanol, triethylamine and ammonia water. These neutralizing agents are preferably used in amounts such that the pH of the aqueous dispersion of acrylic resin emulsion (a) after neutralization is about 6.5 to 9.0.

[Coating Film-Forming Resin (b)]

The coating film-forming resin (b) to be used in the water-based coating composition of the invention is a resin other than the acrylic resin emulsion (a), and examples include polyester resins, water-soluble acrylic resins, urethane resins, polyether resins and polycarbonate resins having one or more hydrophilic groups such as hydroxyl and/or carboxyl in the molecule. Of these, there is preferred a polyester resin (b1) a water-soluble acrylic resin (b2) and a urethane resin (b3), there is more preferred a hydroxyl group-containing polyester resin (b1), a hydroxyl group-containing water-soluble acrylic resin (b2), and a hydroxyl group-containing urethane resin (b3), which contain hydroxyl groups, and there is particularly preferred a hydroxyl group-containing polyester resin (b1) and a hydroxyl group-containing water-soluble acrylic resin (b2). Any of these may be used alone or in combinations of two or more.

[Hydroxyl Group-Containing Polyester Resin (b1)]

The hydroxyl group-containing polyester resin (b1) can be produced, for example, by esterification reaction or transesterification reaction between a polybasic acid component and a polyhydric alcohol component. Specifically, the hydroxyl group-containing polyester resin (b1) can be produced, for example, by conducting esterification reaction with an equivalent ratio of carboxyl groups in the polybasic acid component and hydroxyl groups in the polyhydric alcohol component (COOH/OH) of less than 1, so that there are more hydroxyl groups than carboxyl groups.

Also, the acid value of the hydroxyl group-containing polyester resin (b1) can be adjusted, for example, by conducting the esterification reaction while monitoring the acid value, and completing the esterification reaction when the target acid value has been reached.

The polybasic acid component is a compound having two or more carboxyl groups in the molecule, and examples include polybasic acids such as phthalic acid, isophthalic acid, terephthalic acid, succinic acid, glutaric acid, adipic acid, azelaic acid, sebacic acid, tetrahydrophthalic acid, hexahydrophthalic acid, maleic acid, fumaric acid, itaconic acid, trimellitic acid or pyromellitic acid; anhydrides of these polybasic acids; and lower alkyl esters of these polybasic acids, any one or mixture of two or more of which may be used.

Also, the polyhydric alcohol component is a compound having two or more hydroxyl groups in the molecule, and examples include α-glycols such as ethylene glycol, 1,2-propylene glycol, 1,2-butylene glycol, 2,3-butylene glycol, 1,2-hexanediol, 1,2-dihydroxycyclohexane, 3-ethoxypropane-1,2-diol and 3-phenoxypropane-1,2-diol; and neopentyl glycol, 2-methyl-1,3-propanediol, 2-methyl-2,4-pentanediol, 3-methyl-1,3-butanediol, 2-ethyl-1,3-hexanediol, 2,2-diethyl-1,3-propanediol, 2,2,4-trimethyl-1,3-pentanediol, 2-butyl-2-ethyl-1,3-propanediol, 2-phenoxypropane-1,3-diol, 2-methyl-2-phenylpropane-1,3-diol, 1,3-propylene glycol, 1,3-butylene glycol, 2-ethyl-1,3-octanediol, 1,3-dihydroxycyclohexane, 1,4-butanediol, 1,4-dihydroxycyclohexane, 1,5-pentanediol, 1,6-hexanediol, 2,5-hexanediol, 3-methyl-1,5-pentanediol, 1,4-dimethylolcyclohexane, tricyclodecanedimethanol, 2,2-dimethyl-3-hydroxypropyl-2,2-dimethyl-3-hydroxypropionate (an ester compound of hydroxypivalic acid and neopentyl glycol), bisphenol A, bisphenol F, bis(4-hydroxyhexyl)-2,2-propane, bis(4-hydroxyhexyl)methane, 3,9-bis(1,1-dimethyl-2-hydroxyethyl)-2,4,8,10-tetraoxaspiro[5,5]undecane, diethylene glycol, triethylene glycol, glycerin, diglycerin, triglycerin, pentaerythritol, dipentaerythritol, sorbitol, mannitol, trimethylolethane, trimethylolpropane, ditrimethylolpropane and tris(2-hydroxyethyl)isocyanurate. These may be used either alone or in combinations of two or more.

The esterification or transesterification reaction between the polybasic acid component and the polyhydric alcohol component may be carried out by a known method, such as by polycondensation of the polybasic acid component and the polyhydric alcohol component at a temperature of about 180° C. to 250° C.

Also, the hydroxyl group-containing polyester resin (b1) can be modified with a fatty acid, monoepoxy compound or the like either during preparation of the polyester resin or after the esterification reaction. Examples for the fatty acid include coconut fatty acid, cottonseed oil fatty acid, hempseed oil fatty acid, rice bran oil fatty acid, fish oil fatty acid, tall oil fatty acid, soybean oil fatty acid, linseed oil fatty acid, China wood oil fatty acid, rapeseed oil fatty acid, castor oil fatty acid, dehydrated castor oil fatty acid and safflower oil fatty acid, and a preferred example for the monoepoxy compound is "CARDURA E10P" (trade name of Japan Epoxy Resins Co., Ltd., glycidyl ester of synthetic highly-branched saturated fatty acid).

From the viewpoint of the smoothness of the coating film that is to be obtained, the hydroxyl group-containing polyester resin (b1) has an acid value of no greater than 50 mgKOH/g, preferably 5 to 40 mgKOH/g and more preferably 10 to 35 mgKOH/g, and a number-average molecular weight in the range of 500 to 5,000, preferably 700 to 3,000 and more preferably 1,000 to 2,000. From the viewpoint of curability, the hydroxyl value is in the range of 10 to 200 mgKOH/g, preferably 30 to 180 mgKOH/g and more preferably 50 to 165 mgKOH/g.

The number-average molecular weight or weight-average molecular weight, for the purpose of the present specification, is the value of the number-average molecular weight or weight-average molecular weight measured with a gel permeation chromatograph ("HLC8120GPC" by Tosoh Corp.), converted based on the number-average molecular weight or weight-average molecular weight of polystyrene. Four columns were used for measurement, namely "TSKgel G-4000H×L", "TSKgel G-3000H×L", "TSKgel G-2500H×L" and "TSKgel G-2000H×L" (all trade names of Tosoh Corp.), with the following conditions: mobile phase: tetrahydrofuran, measuring temperature: 40° C., flow rate: 1 mL/min, detector: RI.

[Hydroxyl Group-Containing Water-Soluble Acrylic Resin (b2)]

The hydroxyl group-containing water-soluble acrylic resin (b2) can be produced by (co)polymerization of a polymerizable unsaturated monomer component including a hydroxyl group-containing polymerizable unsaturated monomer under ordinary conditions, and from the viewpoint of the smoothness of the coating film that is to be obtained, the acid value is no greater than 60 mgKOH/g, preferably 1 to 50 mgKOH/g and more preferably 5 to 40 mgKOH/g, and the weight-average molecular weight is in the range of 1,000 to 100,000, preferably 3,000 to 80,000 and more preferably 5,000 to 60,000. Also, from the viewpoint of curability, the hydroxyl value is in the range of 20 to 200 mgKOH/g, preferably 30 to 180 mgKOH/g and more preferably 50 to 165 mgKOH/g.

The hydroxyl group-containing water-soluble acrylic resin (b2) comprises a polymerizable unsaturated monomer having a hydrophilic functional group such as an N-substituted (meth)acrylamide, polyoxyalkylene chain-containing (meth)acrylate, hydroxyl group-containing (meth)acrylate and/or acid group-containing (meth)acrylate, and is dissolved (transparent) in the aqueous medium, and therefore is clearly distinguished from the acrylic resin emulsion (a) which is in a dispersed state in the aqueous medium.

The hydroxyl group-containing polymerizable unsaturated monomer is a compound having one or more hydroxyl groups and one or more polymerizable unsaturated bonds in the molecule, and examples thereof include monoesterified products of (meth)acrylic acid and C2-8 dihydric alcohols, such as 2-hydroxyethyl (meth)acrylate, 2-hydroxypropyl (meth)acrylate, 3-hydroxypropyl (meth)acrylate and 4-hydroxybutyl (meth)acrylate, ε-caprolactone-modified forms of the monoesterified products of (meth)acrylic acid and C2-8 dihydric alcohols, allyl alcohols, and (meth)acrylates having polyoxyethylene chains with molecular ends that are hydroxyl groups. These may be used either alone or in combinations of two or more.

Also, examples of other polymerizable unsaturated monomers that are copolymerizable with the hydroxyl group-containing polymerizable unsaturated monomer include alkyl or cycloalkyl (meth)acrylates such as methyl (meth) acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth) acrylate, octyl (meth)acrylate, 2-ethylhexyl (meth)acrylate, nonyl (meth)acrylate, tridecyl (meth)acrylate, lauryl (meth) acrylate, stearyl (meth)acrylate, "isostearyl acrylate" (trade name of Osaka Organic Chemical Industry, Ltd.), cyclohexyl (meth)acrylate, methylcyclohexyl (meth)acrylate, tert-butylcyclohexyl (meth)acrylate and cyclododecyl (meth)acrylate; polymerizable unsaturated monomers with isobornyl groups, such as isobornyl (meth)acrylate; polymerizable unsaturated monomers with adamantyl groups, such as adamantyl (meth)acrylate; vinyl aromatic compounds such as styrene, α-methylstyrene and vinyltoluene; polymerizable unsaturated monomers with alkoxysilyl groups, such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; perfluoroalkyl (meth)acrylates such as perfluorobutylethyl (meth)acrylate and perfluorooctylethyl (meth)acrylate; polymerizable unsaturated monomers with fluorinated alkyl groups such as fluoroolefins; polymerizable unsaturated monomers with photopolymerizable functional groups, such as maleimide; vinyl compounds such as N-vinylpyrrolidone, ethylene, butadiene, chloroprene, vinyl propionate and vinyl acetate; carboxyl group-containing polymerizable unsaturated monomers such as (meth)acrylic acid, maleic acid, crotonic acid and β-carboxyethyl acrylate; nitrogen-containing polymerizable unsaturated monomers such as (meta)acrylonitrile, (meth)acrylamide, dimethylaminopropyl (meth)acrylamide, dimethylaminoethyl (meth) acrylate and glycidyl (meth)acrylate and amine addition products; (meth)acrylates with polyoxyethylene chains having alkoxy groups on the molecular ends; polymerizable unsaturated monomers with sulfonic acid groups, such as 2-acrylamide-2-methylpropanesulfonic acid, allylsulfonic acid, sodium styrenesulfonate salt, sulfoethyl methacrylate, and their sodium salts or ammonium salts; polymerizable unsaturated monomers with phosphate groups, such as 2-acryloyloxyethyl acid phosphate, 2-methacryloyloxyethyl acid phosphate, 2-acryloyloxypropyl acid phosphate and 2-methacryloyloxypropyl acid phosphate; polymerizable unsaturated monomers with ultraviolet absorbing groups, such as addition reaction products of hydroxybenzophenones such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone and 2,2'-dihydroxy-4-(3-acryloyloxy-2-hydroxypropoxy)benzophenone, and glycidyl (meth)acrylate, or 2-(2'-hydroxy-5'-methacryloyloxyethylphenyl)-2H-benzotriazole; polymerizable unsaturated monomers with ultraviolet ray stabilization performance, such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth) acryloylamino-2,2,6,6-tetramethylpiperidine, 1-(meth) acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine; and polymerizable unsaturated monomers such as acrolein, diacetoneacrylamide, diacetonemethacrylamide, acetoacetoxyethyl methacrylate, formylstyrol, and vinylalkyl ketones with 4-7 carbon atoms (for example, vinylmethyl ketone, vinylethyl ketone and vinylbutyl ketone), any of which may be used alone or in combinations of two or more.

When the hydroxyl group-containing water-soluble acrylic resin (b2) has an acid value, the acid value can be adjusted, for example, by using a carboxyl group-containing polymerizable unsaturated monomer such as (meth)acrylic acid, maleic acid, crotonic acid or β-carboxyethyl acrylate and/or another acid group-containing polymerizable unsaturated monomer, as a polymerizable unsaturated monomer component, and adjusting their contents.

The acid groups may also be neutralized with a neutralizing agent, if necessary. There are no particular restrictions on the neutralizing agent so long as it can neutralize the acidic groups, and examples include sodium hydroxide, potassium hydroxide, trimethylamine, 2-(dimethylamino) ethanol, 2-amino-2-methyl-1-propanol, triethylamine and ammonia water. These may be used either alone or in combinations of two or more.

[Curing Agent (c)]

The curing agent (c) is a compound that reacts with the crosslinkable functional groups such as hydroxyl, carboxyl or epoxy in the acrylic resin emulsion (a) and/or the coating film-forming resin (b), to allow curing of the water-based coating composition of the invention. Examples for the curing agent (c) include amino resins, polyisocyanate compounds, blocked polyisocyanate compounds, epoxy group-containing compounds, carboxyl group-containing compounds and carbodiimide group-containing compounds, and of which may be used alone or in combinations of two or more.

Among these, from the viewpoint of water resistance of the coating film that is to be obtained, the curing agent (c) preferably contains an amino resin (c1) and/or blocked polyisocyanate compound (c2) that can react with hydroxyl groups, and most preferably it contains both an amino resin (c1) and a blocked polyisocyanate compound (c2).

[Amino Resin (c1)]

The amino resin (c1) may be a methylolated amino resin obtained by reaction between an amino component and an aldehyde component, and for example, partial methylolated amino resins and total methylolated amino resins may be mentioned. Examples of such amino components include melamine, urea, benzoguanamine, acetoguanamine, steroguanamine, spiroguanamine and dicyandiamide. Aldehyde components include formaldehyde, paraformaldehyde, acetaldehyde and benzaldehyde.

The amino resin (c1) used may be one in which the methylol groups of the methylolated amino resin are partially or completely etherified with an appropriate alcohol. Examples of alcohols to be used for the etherification include methyl alcohol, ethyl alcohol, n-propyl alcohol, isopropyl alcohol, n-butyl alcohol, isobutyl alcohol, 2-ethyl-1-butanol and 2-ethyl-1-hexanol.

The amino resin (c1) is most preferably a melamine resin (c1'). Types of melamine resins (c1') include alkyletherified melamine resins, methylolated melamine resins, imino group-containing melamine resins and their mixed forms, and in particular there are preferably used methyl etherified melamine resins with the methylol groups of a partially or totally methylolated melamine resin partially or completely etherified with methyl alcohol, butyl etherified melamine resins with the methylol groups of a partially or totally methylolated melamine resin partially or completely etherified with butyl alcohol, methyl etherified melamine resins with the methylol groups of a partially or totally methylolated melamine resin partially or completely etherified with methyl alcohol and butyl alcohol, and methyl-butyl mixed etherified melamine resins, to obtain a multilayer coating film with excellent smoothness, distinctness of image and water resistance, there are more preferably used methyl etherified melamine resins. The melamine resin (c1') used may be a single one or a combination of two or more different ones.

Also, from the viewpoint of the smoothness and distinctness of image of the multilayer coating film that is to be obtained, the melamine resin (c1') has a weight-average molecular weight of preferably 400 to 3,000, more preferably 450 to 2,000 and even more preferably 500 to 1,000.

The melamine resin (c1') that is used may be a commercial product. Examples of trade names of commercial products include "SAIMEL 202", "SAIMEL 203", "SAIMEL 204", "SAIMEL 211", "SAIMEL 238", "SAIMEL 251", "SAIMEL 303", "SAIMEL 323", "SAIMEL 324", "SAIMEL 325", "SAIMEL 327", "SAIMEL 350", "SAIMEL 385", "SAIMEL 1156", "SAIMEL 1158", "SAIMEL 1116", "SAIMEL 1130" (all products of Nihon Cytec Industries Inc.), "U-VAN 120", "U-VAN 20HS", "U-VAN 20SE60", "U-VAN 2021", "U-VAN 2028" and "U-VAN 28-60" (all products of Mitsui Chemicals, Inc.).

Also, when the curing agent (c) employs the aforementioned amino resin (c1), a sulfonic acid such as para-toluenesulfonic acid, dodecylbenzenesulfonic acid or dinonylnaphthalenesulfonic acid or a salt of such a sulfonic acid with an amine compound may be used as a catalyst.

[Blocked Polyisocyanate Compound (c2)]

The blocked polyisocyanate compound (c2) is not particularly restricted, and may be synthesized using a common polyisocyanate compound and blocking agent.

The polyisocyanate compound can be obtained using the following diisocyanates as the main starting materials.

Diisocyanates are aliphatic and/or alicyclic diisocyanates. Aliphatic diisocyanates are preferably C4-30 while alicyclic diisocyanates are preferably C8-30, and examples include 1,4-tetramethylene diisocyanate, 1,5-pentamethylene diisocyanate, 1,6-hexamethylene diisocyanate, 2,2,4-trimethyl-1,6-hexamethylene diisocyanate, lysine diisocyanate, isophorone diisocyanate, 1,3-bis(isocyanatomethyl)-cyclohexane and 4,4'-dicyclohexylmethane diisocyanate. Preferred among these are 1,6-hexamethylene diisocyanate or isophorone diisocyanate, for weather resistance and/or industrial availability, and they may be used alone or in combinations.

The polyisocyanate compound has about 2 to 20 isocyanate groups in the molecule, and for example, it is a dimer to 20 mer oligomer of diisocyanate produced by forming biuret bonds, urea bonds, isocyanurate bonds, urethodione bonds, urethane bonds, allophanate bonds, oxadiazinetrione bonds or the like.

The blocking agent used for blocking of the isocyanate groups of the polyisocyanate compound may be a publicly known one, and for example, there may be suitably used active methylene-based, phenol-based, alcohol-based, mercaptane-based, acid amide-based, imide-based, amine-based, imidazole-based, urea-based, carbamate-based, imine-based, oxime-based and sulfite-based compounds.

Also, the blocked polyisocyanate compound is preferably a blocked polyisocyanate compound with a hydrophilic group, from the viewpoint of storage stability and curability of the water-based coating composition, and smoothness and distinctness of image of the multilayer coating film that is to be formed.

The blocked polyisocyanate compound with a hydrophilic group can be obtained, for example, by using an active hydrogen-containing compound with a hydrophilic group, such as an active hydrogen-containing compound with a nonionic hydrophilic group, an active hydrogen-containing compound with an anionic hydrophilic group, or an active hydrogen-containing compound with a cationic hydrophilic group.

Preferred for the active hydrogen-containing compound with a hydrophilic group are active hydrogen-containing compounds with nonionic hydrophilic groups, among which polyethyleneglycol monomethyl ether, polyethyleneglycol monoethyl ether and polyethylene glycol are preferred, and polyethyleneglycol monomethyl ether is more preferred.

Also, an active methylene-type blocked polyisocyanate compound (c3) may be suitably used as the blocked polyisocyanate compound.

[Active Methylene-Type Blocked Polyisocyanate Compound (c3)]

The blocked polyisocyanate compound (c3) comprises an active methylene-type blocked polyisocyanate compound with at least one type of blocked isocyanate group selected from the group consisting of blocked isocyanate groups represented by the following formula (I):

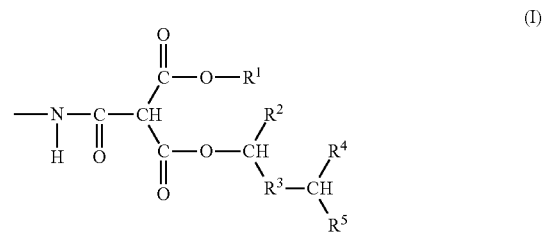

(wherein $R^1$, $R^2$, $R^4$ and $R^5$ each independently represent a C1-12 hydrocarbon group and $R^3$ represents a C1-12 straight-chain or branched alkylene group), blocked isocyanate groups represented by the following formula (II):

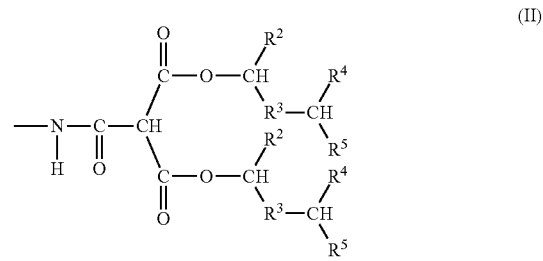

(wherein $R^2$, $R^3$, $R^4$ and $R^5$ have the same definitions as above), and blocked isocyanate groups represented by the following formula (III):

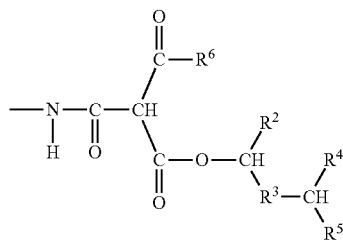

(III)

(wherein $R^2$, $R^3$, $R^4$ and $R^5$ have the same definitions as above, and $R^6$ represents a C1-12 hydrocarbon group).

The method of synthesizing the active methylene-type blocked polyisocyanate compound (c3) may be, for example, a method of reacting an active methylene compound (cb2) with the isocyanate groups of a polyisocyanate compound (cb1) with two or more isocyanate groups in the molecule, to obtain an active methylene-type blocked polyisocyanate compound (cb3), and then reacting the obtained active methylene-type blocked polyisocyanate compound (cb3) with a secondary alcohol (cb4), or a method of reacting the reaction product of an active methylene compound (cb2) and a secondary alcohol (cb4) with the isocyanate groups of a polyisocyanate compound (cb1), with the former method being especially preferred.

[Polyisocyanate Compound (Cb1)]

The polyisocyanate compound (cb1) is a compound with at least two isocyanate groups in the molecule, and examples include aliphatic polyisocyanates, alicyclic polyisocyanates, aromatic/aliphatic polyisocyanates, aromatic polyisocyanates, and derivatives of these polyisocyanates.

Examples of aliphatic polyisocyanates include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate and methyl 2,6-diisocyanatohexanoate (common name: lysine diisocyanate); and aliphatic triisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, methylene bis(4,1-cyclohexanediyl)diisocyanate (common name: hydrogenated MDI) and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane.

Examples of aromatic/aliphatic polyisocyanates include aromatic/aliphatic diisocyanates such as methylene bis(4,1-phenylene)diisocyanate (common name: MDI), 1,3- or 1,4-xylylene diisocyanate or mixtures thereof, ω,ω'-diisocyanato-1,4-diethylbenzene and 1,3- or 1,4-bis(1-isocyanato-1-methylethyl)benzene (common name: tetramethylxylylene diisocyanate) or mixtures thereof; and aromatic/aliphatic triisocyanates such as 1,3,5-triisocyanatomethylbenzene.

Examples of aromatic polyisocyanates include aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI), or mixtures thereof, 4,4'-toluidine diisocyanate and 4,4'-diphenyl ether diisocyanate; aromatic triisocyanates such as triphenylmethane-4,4',4''-triisocyanate, 1,3,5-triisocyanatobenzene and 2,4,6-triisocyanatotoluene; and aromatic tetraisocyanates such as 4,4'-diphenylmethane-2,2',5,5'-tetraisocyanate.

Examples of the aforementioned polyisocyanate derivatives include the aforementioned polyisocyanate dimers, trimers, biurets, allophanates, urethodiones, urethoimines, isocyanurates, oxadiazinetriones and the like, as well as polymethylenepolyphenyl polyisocyanate (crude MDI, polymeric MDI) and crude TDI.

These polyisocyanates and their derivatives may be used alone or in combinations of two or more. Also, among these polyisocyanates, aliphatic diisocyanates, alicyclic diisocyanates and their derivatives are preferred as the polyisocyanate compound (cb1), because they minimize yellowing of the obtained active methylene-type blocked polyisocyanate compound (c3) during heating. From the viewpoint of improving flexibility of the coating film that is to be formed, aliphatic diisocyanates and their derivatives are more preferred.

Also, the polyisocyanate compound (cb1) that is used may be a prepolymer obtained by reacting any of the aforementioned polyisocyanates and their derivatives with a compound that can react with the polyisocyanate, under conditions with an excess of isocyanate groups. Compounds that can react with the aforementioned polyisocyanates include compounds with active hydrogen groups such as hydroxyl and amino, and specifically there may be used polyhydric alcohols, low molecular weight polyester resins, amines, water and the like.

Also, the polyisocyanate compound (cb1) used may be a polymer of an isocyanate group-containing polymerizable unsaturated monomer, or a copolymer of such an isocyanate group-containing polymerizable unsaturated monomer and a polymerizable unsaturated monomer other than the isocyanate group-containing polymerizable unsaturated monomer.

From the viewpoint of reactivity of the active methylene-type blocked polyisocyanate compound (c3) that is to be obtained and compatibility between the active methylene-type blocked polyisocyanate compound (c3) and the other coating material component, the polyisocyanate compound (cb1) has a number-average molecular weight of preferably in the range of 300 to 20,000, more preferably in the range of 400 to 8,000 and even more preferably in the range of 500 to 2,000.

Also, from the viewpoint of reactivity of the active methylene-type blocked polyisocyanate compound (c3) that is to be obtained and compatibility between the active methylene-type blocked polyisocyanate compound (c3) and the other coating material component, the polyisocyanate compound (cb1) has an average number of isocyanate functional groups in the molecule in the range of 2 to 100. The lower limit is more preferably 3 from the viewpoint of increasing the reactivity of the active methylene-type blocked polyisocyanate compound (c3) that is to be obtained. The upper limit is more preferably 20 from the viewpoint of preventing gelling during production of the active methylene-type blocked polyisocyanate compound (c3).

[Active Methylene Compound (Cb2)]

Examples for the active methylene compound (cb2) that blocks the isocyanate groups in the polyisocyanate compound (cb1) include malonic acid diesters such as dimethyl malonate, diethyl malonate, di-n-propyl malonate, diisopropyl malonate, di-n-butyl malonate, diisobutyl malonate, disec-butyl malonate, di-tert-butyl malonate, di-n-pentyl malonate, di-n-hexyl malonate, di(2-ethylhexyl) malonate, methylisopropyl malonate, ethylisopropyl malonate, methyl-n-butyl malonate, ethyl-n-butyl malonate, methylisobutyl malonate, ethylisobutyl malonate, methyl-sec-butyl malonate, ethyl-sec-butyl malonate, diphenyl malonate and dibenzyl malonate, acetoacetic acid esters such as methyl acetoacetate, ethyl acetoacetate, n-propyl acetoacetate, isopropyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate and benzyl acetoacetate, and isobutyrylacetic acid esters such as methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate and benzyl isobutyrylacetate, any of which may be used alone or in combinations of two or more.

From the viewpoint of the smoothness and distinctness of image of the multilayer coating film that is to be formed, the active methylene compound (cb2) is preferably at least one type of compound selected from the group consisting of dimethyl malonate, diethyl malonate, diisopropyl malonate, methyl acetoacetate, ethyl acetoacetate, methyl isobutyrylacetate and ethyl isobutyrylacetate, and more preferably at least one type of compound selected from the group consisting of diisopropyl malonate, methyl isobutyrylacetate and ethyl isobutyrylacetate. Diisopropyl malonate is more preferred among these from the viewpoint of the smoothness and distinctness of image of the multilayer coating film that is to be formed, the reactivity of the active methylene-type blocked polyisocyanate compound (c3) that is to be obtained and the storage stability of the water-based coating composition.

The blocking reaction of isocyanate groups by the active methylene compound (cb2) may employ a reaction catalyst if necessary. Acceptable examples for the reaction catalyst include basic compounds such as metal hydroxides, metal alkoxides, metal carboxylates, metal acetylacetonates, onium salt hydroxides, onium carboxylates, metal salts of active methylene compounds, onium salts of active methylene compounds, aminosilanes, amines, phosphines, and the like. Preferred among these as onium salts are ammonium salts, phosphonium salts and sulfonium salts. The amount of reaction catalyst used is, for most cases, preferably in the range of 10 to 10,000 ppm and more preferably in the range of 20 to 5,000 ppm, based on the total solid mass of the polyisocyanate compound (cb1) and the active methylene compound (cb2).

The blocking reaction of isocyanate groups by the active methylene compound (cb2) may be conducted at 0° C. to 150° C. using a solvent. In this case, the solvent is preferably an aprotic solvent, with solvents such as esters, ethers, N-alkylamides and ketones being especially preferred. If the reaction has proceeded as designed, an acid component may be added to neutralize the basic compound used as the catalyst, and halt the reaction.

There are no particular restrictions on the amount of active methylene compound (cb2) used for the blocking reaction of the isocyanate groups by the active methylene compound (cb2), but 0.1 to 3 mol and preferably 0.2 to 2 mol may be used with respect to 1 mol of isocyanate groups in the polyisocyanate compound (cb1). Also, the active methylene compound that has not reacted with isocyanate groups in the polyisocyanate compound (cb1) may be removed after completion of the blocking reaction.

Also, together with the active methylene compound (cb2) there may be added, for example, an alcohol-based, phenol-based, oxime-based, amine-based, acid amide-based, imidazole-based, pyridine-based or mercaptane-based blocking agent.

Some of the isocyanate groups in the polyisocyanate compound (cb1) may also be reacted with an active hydrogen-containing compound. By reacting some of the isocyanate groups in the polyisocyanate compound (cb1) with an active hydrogen-containing compound, it is possible to improve the storage stability of the active methylene-type blocked polyisocyanate compound (c3) that is obtained, to modify the compatibility between the active methylene-type blocked polyisocyanate compound (c3) and the other coating material components, and to increase flexibility of the coating film that is to be formed.

When some of the isocyanate groups in the polyisocyanate compound (cb1) are to be reacted with the active hydrogen-containing compound, the order of reacting the polyisocyanate compound (cb1), the active methylene compound (cb2) and the active hydrogen-containing compound is not particularly restricted. Specifically, there may be mentioned a method of blocking some of the isocyanate groups in a polyisocyanate compound (cb1) with an active methylene compound (cb2), and then reacting an active hydrogen-containing compound with the remaining isocyanate groups, a method of reacting an active hydrogen-containing compound with some of the isocyanate groups in a polyisocyanate compound (cb1) and then blocking the remaining isocyanate groups with an active methylene compound (cb2), and a method of simultaneously reacting an active methylene compound (cb2) and an active hydrogen-containing compound with the isocyanate groups in a polyisocyanate compound (cb1).

Examples for the active hydrogen-containing compound include hydroxyl group-containing compounds and amino group-containing compounds.

Examples of hydroxyl group-containing compounds include propanol, butanol, pentanol, hexanol, heptanol, 2-ethyl-1-hexanol, octanol, nonanol, decanol, tridecanol, stearyl alcohol, ethylene glycol, propylene glycol, polyethylene glycol, polypropylene glycol, polyethylene glycol (propylene glycol), polyethyleneglycol monoalkyl ethers, polypropyleneglycol monoalkyl ethers, polyethylene glycol (propylene glycol), monoalkyl ethers and trimethylolpropane, any of which may be used alone or in combinations of two or more. As used herein, "polyethylene glycol (propylene glycol)" means a copolymer of ethylene glycol and propylene glycol, and it includes both their block copolymers and random copolymers.

The hydroxyl group-containing compound is preferably a monovalent alcohol from the viewpoint of minimizing viscosity increase of the active methylene-type blocked polyisocyanate compound (c3) that is to be obtained.

Examples of monovalent alcohols include propanol, butanol, pentanol, hexanol, heptanol, 2-ethyl-1-hexanol, octanol, nonanol, decanol, tridecanol, stearyl alcohol, polyethyleneglycol monoalkyl ether, polypropyleneglycol monoalkyl ether, polyethylene glycol (propylene glycol) and monoalkyl ethers, any of which may be used alone or in combinations of two or more.

Also, examples for the amino group-containing compound include butylamine, octylamine, stearylamine, dibutylamine, dioctylamine, dicyclohexylamine, dilaurylamine, α-(aminoalkyl)-ω-alkoxypolyoxyethylene (oxypropylene)s, hexamethylenediamine, diethylenetriamine and polyoxypropylene-α,ω-diamine (examples of commercial products including "JEFFAMINE D-400" by Huntsman Corp.), any of which may be used alone or in combinations of two or more.

The amino group-containing compound is preferably a monovalent amine from the viewpoint of minimizing viscosity increase of the active methylene-type blocked polyisocyanate compound (c3) that is to be obtained. Examples of monovalent amines include butylamine, octylamine, stearylamine, dibutylamine, dioctylamine, dicyclohexylamine, dilaurylamine and α-(aminoalkyl)-ω-alkoxypolyoxyethylene (oxypropylene)s, any of which may be used alone or in combinations of two or more.

When the active hydrogen-containing compound is to be reacted with some of the isocyanate groups in the polyisocyanate compound (cb1), the reacting proportion of the polyisocyanate compound (cb1) and the active hydrogen-containing compound is preferably such that the number of moles of active hydrogen in the active hydrogen-containing compound is in the range of 0.03 to 0.6 mol based on 1 mol of isocyanate groups in the polyisocyanate compound (cb1), from the viewpoint of storage stability and curability of the water-based coating composition, and smoothness, distinctness of image and water resistance of the multilayer coating film that is to be formed. The upper limit is preferably 0.4 and more preferably 0.3, from the viewpoint of curability of the water-based coating composition and water resistance of the multilayer coating film that is to be formed. The lower limit is preferably 0.04 and more preferably 0.05, from the viewpoint of storage stability of the water-based coating composition and smoothness and distinctness of image of the multilayer coating film that is to be formed.

Also, the active methylene-type blocked polyisocyanate compound (c3) is preferably an active methylene-type blocked polyisocyanate compound (c3') with a hydrophilic group, from the viewpoint of storage stability and curability of the water-based coating composition, and smoothness and distinctness of image of the multilayer coating film that is to be formed.

The active methylene-type blocked polyisocyanate compound (c3') with a hydrophilic group may be obtained, for example, using an active hydrogen-containing compound with a hydrophilic group as the active hydrogen-containing compound.

The active hydrogen-containing compound with a hydrophilic group may be an active hydrogen-containing compound with a nonionic hydrophilic group, an active hydrogen-containing compound with an anionic hydrophilic group, an active hydrogen-containing compound with a cationic hydrophilic group, or the like, and any one or a combination of two or more of these may be used. Of these, it is preferred to use an active hydrogen-containing compound with a nonionic hydrophilic group, in order to minimize inhibition of the reaction of blocking the isocyanate groups in the polyisocyanate compound (cb1) with the active methylene compound (cb2).

Examples of active hydrogen-containing compounds having nonionic hydrophilic groups that are suitable for use include active hydrogen-containing compounds having polyoxyalkylene groups. Examples of polyoxyalkylene groups include polyoxyethylene, polyoxypropylene and polyoxyethylene (oxypropylene), any of which may be used alone or in combinations of two or more. Of these, active hydrogen-containing compounds with polyoxyethylene groups are preferred from the viewpoint of storage stability of the water-based coating composition.

The active hydrogen-containing compound with a polyoxyethylene group may have 3 or more, preferably 5 to 100 and more preferably 8 to 45 linked oxyethylene groups, from the viewpoint of storage stability of the water-based coating composition and water resistance of the multilayer coating film that is to be formed.

Also, the active hydrogen-containing compound with a polyoxyethylene group may contain an oxyalkylene group other than an oxyethylene group, in addition to the linked oxyethylene groups. Examples of oxyalkylene groups other than the oxyethylene groups include oxypropylene, oxybutylene and oxyhexylene. The molar ratio of oxyethylene groups among the oxyalkylene groups in the active hydrogen-containing compound with polyoxyethylene groups is preferably in the range of 20 to 100 mol % and more preferably in the range of 50 to 100 mol %, from the viewpoint of storage stability of the water-based coating composition. If the molar ratio of oxyethylene groups among the oxyalkylene groups is less than 20 mol %, the hydrophilicity imparted may be inadequate, and the storage stability of the water-based coating composition.

Also, the active hydrogen-containing compound with a nonionic hydrophilic group preferably has a number-average molecular weight in the range of 200 to 2,000, from the viewpoint of the storage stability of the water-based coating composition and the water resistance of the multilayer coating film that is to be formed. The lower limit for the number-average molecular weight is more preferably 300 and even more preferably 400 from the viewpoint of the storage stability of the water-based coating composition. The upper limit is preferably 1,500 and more preferably 1,200, from the viewpoint of the water resistance of the multilayer coating film that is to be formed.

Examples of active hydrogen-containing compounds with nonionic hydrophilic groups include polyethyleneglycol monoalkyl ethers (alternate name: ω-alkoxypolyoxyethylenes) such as polyethyleneglycol monomethyl ether and polyethyleneglycol monoethyl ether, polypropyleneglycol monoalkyl ethers (alternate name: (ω-alkoxypolyoxypropylenes) such as polypropyleneglycol monomethyl ether and polypropyleneglycol monoethyl ether, ω-alkoxypolyoxyethylene(oxypropylene)s such as ω-methoxypolyoxyethylene (oxypropylene) and ω-ethoxypolyoxyethylene(oxypropylene), polyethylene glycol (propylene glycol)monoalkyl ethers such as polyethylene glycol (propylene glycol)monomethyl ether and polyethylene glycol (propylene glycol) monoethyl ether, and polyethylene glycol, polypropylene glycol, polyethylene glycol (propylene glycol), α-(aminoalkyl)-ω-alkoxypolyoxyethylene, α-(aminoalkyl)-ω- alkoxypolyoxypropylene, α-(aminoalkyl)-ω-alkoxypolyoxyethylene and the like, any of which may be used alone or in combinations of two or more. Preferred among these are polyethyleneglycol monomethyl ether, polyethyleneglycol monoethyl ether and polyethylene glycol, with polyethyleneglycol monomethyl ether being more preferred.

Examples of commercial products of polyethyleneglycol monomethyl ether include "UNIOX M-400", "UNIOX M-550", "UNIOX M-1000" and "UNIOX M-2000" by NOF Corp. Also, examples of commercial products of polyethylene glycol include "PEG #200", "PEG #300", "PEG #400", "PEG #600", "PEG #1000", "PEG #1500", "PEG #1540" and "PEG #2000" by NOF Corp.

Examples of active hydrogen-containing compounds with anionic hydrophilic groups include active hydrogen-containing compounds with carboxyl groups, active hydrogen-containing compounds with sulfonic acid groups and active hydrogen-containing compounds with phosphate groups, as well as their neutralized salts, and any of these may be used alone or in combinations of two or more. Of these, active hydrogen-containing compounds with carboxyl groups are preferred for use from the viewpoint of compatibility between the active methylene-type blocked polyisocyanate compound (c3) to be obtained and the other coating material components.

Some or all of the acidic groups in the active hydrogen-containing compound with an anionic hydrophilic group are preferably neutralized with a basic compound, in order to inhibit blocking reaction of the isocyanate groups in the polyisocyanate compound (cb1) by the active methylene compound (cb2).

Neutralization of the acidic groups in the active hydrogen-containing compound with an anionic group may be accomplished before the reaction between the active hydrogen-containing compound with an anionic group and the polyisocyanate compound (cb1), or after the reaction.

Examples of basic compounds include hydroxides of alkali metals or alkaline earth metals such as sodium hydroxide, potassium hydroxide, lithium hydroxide, calcium hydroxide and barium hydroxide; metal alkoxides; ammonia; primary monoamines such as ethylamine, propylamine, butylamine, benzylamine, monoethanolamine, 2,2-dimethyl-3-amino-1-propanol, 2-aminopropanol, 2-amino-2-methyl-1-propanol and 3-aminopropanol; secondary monoamines such as diethylamine, diethanolamine, di-n-propanolamine, di-isopropanolamine, N-methylethanolamine and N-ethylethanolamine; tertiary monoamines such as dimethylethanolamine, trimethylamine, triethylamine, triisopropylamine, methyldiethanolamine and 2-(dimethylamino)ethanol; and polyamines such as diethylenetriamine, hydroxyethylaminoethylamine, ethylaminoethylamine and methylaminopropylamine, any of which may be used alone or in combinations of two or more. The amount of basic compound used may generally be in the range of 0.1 to 1.5 equivalents and preferably 0.2 to 1.2 equivalents, with respect to the anionic groups in the active hydrogen-containing compound with an anionic group.

Examples of active hydrogen-containing compounds having carboxyl groups include monohydroxycarboxylic acids such as glycolic acid, lactic acid, hydroxypivalic acid, malic acid and citric acid, dihydroxycarboxylic acids such as 2,2-dimethylolacetic acid, 2,2-dimethylollactic acid, 2,2-dimethylolpropionic acid, 2,2-dimethylolbutanoic acid, dimethylolheptanoic acid, dimethylolnonanoic acid, 2,2-dimethylolbutyric acid and 2,2-dimethylolvaleric acid, lactone ring-opening addition products of these dihydroxycarboxylic acids, glycine, 1-carboxy-1,5-pentylenediamine, dihydroxybenzoic acid, 3,5-diaminobenzoic acid, lysine, arginine, and the like.

Examples of active hydrogen-containing compounds having sulfonic acid groups include 2-amino-1-ethanesulfonic acid, N,N-bis(2-hydroxyethyl)-2-aminoethanesulfonic acid, 1,3-phenylenediamine-4,6-disulfonic acid, diaminobutanesulfonic acid, 3,6-diamino-2-toluenesulfonic acid, 2,4-diamino-5-toluenesulfonic acid, 2-(cyclohexylamino)-ethanesulfonic acid and 3-(cyclohexylamino)-propanesulfonic acid.

Examples of active hydrogen-containing compounds having phosphate groups include 2,3-dihydroxypropylphenyl phosphate, hydroxyalkylphosphonic acids and aminoalkylphosphonic acids.

When the active hydrogen-containing compound with a hydrophilic group is to be reacted with some of the isocyanate groups in the polyisocyanate compound (cb1), the reacting proportion of the polyisocyanate compound (cb1) and the active hydrogen-containing compound with a hydrophilic group is preferably such that the number of moles of active hydrogen in the active hydrogen-containing compound is in the range of 0.03 to 0.6 mol based on 1 mol of isocyanate groups in the polyisocyanate compound (cb1), from the viewpoint of storage stability and curability of the water-based coating composition, and smoothness, distinctness of image and water resistance of the multilayer coating film that is to be formed. The upper limit is preferably 0.4 and more preferably 0.3, from the viewpoint of curability of the water-based coating composition and water resistance of the multilayer coating film that is to be formed. The lower limit is preferably 0.04 and more preferably 0.05, from the viewpoint of storage stability of the water-based coating composition and smoothness and distinctness of image of the multilayer coating film that is to be formed.

The active methylene-type blocked polyisocyanate compound (c3) can be imparted with water dispersibility by premixture with a surfactant. In this case, the surfactant is preferably a nonionic surfactant and/or anionic surfactant, from the viewpoint of stability of the coating material.

[Active Methylene-Type Blocked Polyisocyanate Compound (cb3)]

The active methylene-type blocked polyisocyanate compound (cb3) is a compound in which some or all of the isocyanate groups in a polyisocyanate compound (cb1) are blocked with an active methylene compound (cb2) by reacting the polyisocyanate compound (cb1) having two or more isocyanate groups in the molecule with the active methylene compound (cb2).

Among these, it is preferred for the active methylene-type blocked polyisocyanate compound (cb3) to be either or both an active methylene-type blocked polyisocyanate compound (cb3-1) with a blocked isocyanate group, represented by the following formula (IV):

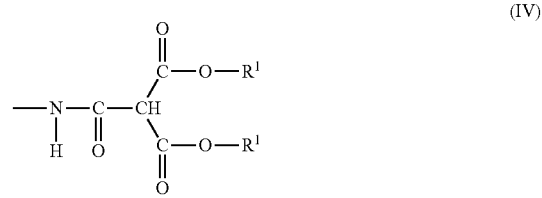

(wherein each $R^1$ independently represents a C1-12 hydrocarbon group, and may be the same or different), or an active methylene-type blocked polyisocyanate compound (cb3-2) with a blocked isocyanate group, represented by the following formula (V):

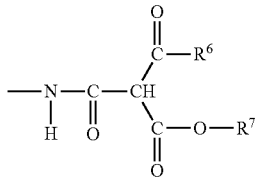

(wherein $R^6$ and $R^7$ each independently represent a C1-12 hydrocarbon group).

[Active Methylene-Type Blocked Polyisocyanate Compound (cb3-1)]

The active methylene-type blocked polyisocyanate compound (cb3-1) is an active methylene-type blocked polyisocyanate compound with a blocked isocyanate group, represented by formula (IV) above.

Among these, preferably $R^1$ is a C1-3 alkyl group in the active methylene compound (cb2), as one of the starting materials for the active methylene-type blocked polyisocyanate compound, from the viewpoint of allowing use of an active methylene compound that can be produced relatively easily. Of these, from the viewpoint of improving compatibility between the active methylene-type blocked polyisocyanate compound (c3) that is to be obtained and the other coating material components, $R^1$ is more preferably a C2 or C3 alkyl group, and from the viewpoint of storage stability of the water-based coating composition and the smoothness and distinctness of image of the multilayer coating film that is to be formed, $R^1$ is more preferably an isopropyl group.

The active methylene-type blocked polyisocyanate compound (cb3-1) can be obtained, for example, by reacting the polyisocyanate compound (cb1) with a dialkyl malonate having a C1-12 hydrocarbon group.

Examples of such dialkyl malonates include dimethyl malonate, diethyl malonate, di-n-propyl malonate, diisopropyl malonate, di-n-butyl malonate, diisobutyl malonate, disec-butyl malonate, di-tert-butyl malonate, di-n-pentyl malonate, di-n-hexyl malonate and di(2-ethylhexyl) malonate, any of which may be used alone or in combinations of two or more. Of these, dimethyl malonate, diethyl malonate, di-n-propyl malonate, diisopropyl malonate, di-n-butyl malonate, diisobutyl malonate, di-sec-butyl malonate and di-tert-butyl malonate are preferred, diethyl malonate, di-n-propyl malonate and diisopropyl malonate are more preferred, and diisopropyl malonate is even more preferred.

[Active Methylene-Type Blocked Polyisocyanate Compound (cb3-2)]

The active methylene-type blocked polyisocyanate compound (cb3-2) is an active methylene-type blocked polyisocyanate compound with a blocked isocyanate group, represented by formula (V) above.

Among these, preferably $R^6$ and $R^7$ are C1-3 alkyl groups in the active methylene compound (cb2), as one of the starting materials for the active methylene-type blocked polyisocyanate compound, from the viewpoint of allowing use of an active methylene compound that can be produced relatively easily. From the viewpoint of improving compatibility between the active methylene-type blocked polyisocyanate compound (c3) that is to be obtained and the other coating material components, $R^6$ and $R^7$ are more preferably C2 or C3 alkyl groups, and from the viewpoint of storage stability of the water-based coating composition, and the smoothness and distinctness of image of the multilayer coating film that is to be formed, $R^6$ and $R^7$ are even more preferably isopropyl groups.

The active methylene-type blocked polyisocyanate compound (cb3-2) can be obtained, for example, by reacting the polyisocyanate compound (cb1) and an acetoacetic acid ester having a C1-12 hydrocarbon group, or by reacting the polyisocyanate compound (cb1) with an isobutyrylacetic acid ester having a C1-12 hydrocarbon group. Of these methods, it is preferably obtained by reacting the polyisocyanate compound (cb1) with an isobutyrylacetic acid ester having a C1-12 hydrocarbon group.

Examples for the isobutyrylacetic acid ester include methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate and benzyl isobutyrylacetate, any of which may be used alone or in combinations of two or more. Preferred among these are methyl isobutyrylacetate, ethyl isobutyrylacetate and isopropyl isobutyrylacetate.

Also, examples of acetoacetic acid esters include methyl acetoacetate, ethyl acetoacetate, n-propyl acetoacetate, isopropyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate and benzyl acetoacetate, any of which may be used alone or in combinations of two or more. Preferred among these are methyl acetoacetate, ethyl acetoacetate and isopropyl acetoacetate.

Also, the active methylene-type blocked polyisocyanate compound (cb3) may be a compound obtained by reacting a polyisocyanate compound (cb1) having two or more isocyanate groups in the molecule, an active methylene compound (cb2) and the aforementioned active hydrogen-containing compound. Specifically, by using the aforementioned active hydrogen-containing compound with a polyoxyalkylene group, for example, as the aforementioned active hydrogen-containing compound, it is possible to produce an active methylene-type blocked polyisocyanate compound wherein some of the isocyanate groups in the polyisocyanate compound (cb1) are blocked with an active methylene compound (cb2), and some or all of the other isocyanate groups have reacted with the active hydrogen-containing compound with a polyoxyalkylene group.

[Secondary Alcohol (Cb4)]

According to the invention, the active methylene-type blocked polyisocyanate compound (c3) can be obtained, for example, by reacting the active methylene-type blocked polyisocyanate compound (cb3) with as secondary alcohol (cb4) represented by the following formula (VI):

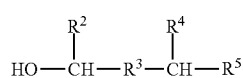

(wherein $R^2$, $R^4$ and $R^5$ each independently represent a C1-12 hydrocarbon group, and $R^3$ represents a C1-12 straight-chain or branched alkylene group).

The secondary alcohol (cb4) is a compound represented by formula (VI) above. Of these, $R^2$ is preferably a methyl group from the viewpoint of increasing reactivity between the active methylene-type blocked polyisocyanate compound (cb3) and the secondary alcohol (cb4). Also, if $R^3$, $R^4$ and $R^5$ each have high carbon numbers, the polarity of the obtained active methylene-type blocked polyisocyanate compound (c3) may be reduced and compatibility with the other coating material components may be lowered, and therefore $R^3$ is preferably a C1-3 alkylene group, and $R^4$ and $R^5$ are preferably methyl groups.

Examples for the secondary alcohol (cb4) include 4-methyl-2-pentanol, 5-methyl-2-hexanol, 6-methyl-2-heptanol and 7-methyl-2-octanol, any of which may be used alone or in combinations of two or more. Of these, 4-methyl-2-pentanol which has a relatively low boiling point is more preferred, since this will help facilitate removal of the secondary alcohol (cb4) when some or all of the unreacted secondary alcohol (cb4) is distilled off following reaction between the blocked polyisocyanate compound (cb3) and the secondary alcohol (cb4).

Specifically, the active methylene-type blocked polyisocyanate compound (c3) can be obtained, for example, by reacting an active methylene-type blocked polyisocyanate compound (cb3-1) having a blocked isocyanate group, represented by the following formula (IV):

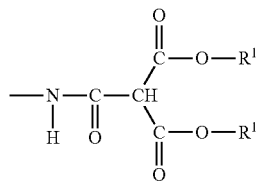

(IV)

(wherein each $R^1$ independently represents a C1-12 hydrocarbon group, and may be the same or different), mentioned above in explaining the active methylene-type blocked polyisocyanate compound (cb3), with the aforementioned secondary alcohol (cb4).

In this case, at least one of the $R^1$ groups in the blocked isocyanate group in the active methylene-type blocked polyisocyanate compound (cb3-1) is replaced with a group represented by the following formula (VII):

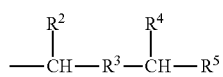

(VII)

(wherein $R^2$, $R^4$ and $R^5$ each independently represent a C1-12 hydrocarbon group, and $R^3$ represents a C1-12 straight-chain or branched alkylene group).

Also in this case, the active methylene-type blocked polyisocyanate compound (c3) that is obtained has a blocked isocyanate group represented by the following formula (I):

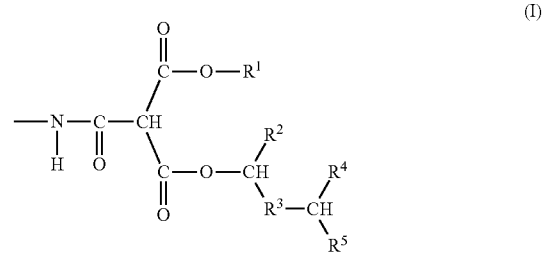

(I)

(wherein $R^1$, $R^2$, $R^4$ and $R^5$ each independently represent a C1-12 hydrocarbon group, and $R^3$ represents a C1-12 straight-chain or branched alkylene group).

In formula (I), $R^1$ is more preferably a C1-8 hydrocarbon group, even more preferably a C1-4 hydrocarbon group and most preferably a C2-3 hydrocarbon group.

Also, the active methylene-type blocked polyisocyanate compound (c3) that is obtained has a blocked isocyanate group represented by the following formula (II):

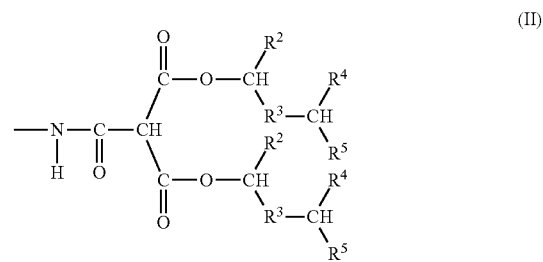

(II)

(wherein $R^2$, $R^3$, $R^4$ and $R^5$ are as defined above).

The reaction between the active methylene-type blocked polyisocyanate compound (cb3-1) and the secondary alcohol (cb4) is not particularly restricted so long as it is a method that, for example, can replace at least one $R^1$ group of the blocked isocyanate group in the active methylene-type blocked polyisocyanate compound (cb3-1) with a group represented by formula (VII) above. Preferred among such methods is a method in which some or all of the alcohols derived from at least one $R^1$ group in the active methylene-type blocked polyisocyanate compound (cb3-1) are distilled out of the system by heating and pressure reduction or the like, and reaction is promoted to obtain an active methylene-type blocked polyisocyanate compound (C3) having a blocked isocyanate group represented by formula (I) or (II) above.

Specifically, as the production method, some or all of the alcohol may be removed by 5 minutes to 20 hours and preferably 10 minutes to 10 hours at a temperature of 20° C. to 150° C. and preferably 75° C. to 95° C., under reduced pressure if necessary. If the temperature is too low the exchange reaction of the alkoxy groups in the active methylene-type blocked polyisocyanate compound (cb3-1) will be slow, lowering the production efficiency, while if it is too high, the active methylene-type blocked polyisocyanate compound (c3) may violently decompose and degrade, sometimes lowering the curability.

The active methylene-type blocked polyisocyanate compound (c3) can also be obtained by reacting an active methylene-type blocked polyisocyanate compound (cb3-2) having a blocked isocyanate group, represented by the following formula (V):

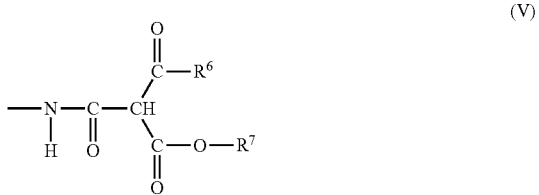

(V)

(wherein $R^6$ and $R^7$ each independently represent a C1-12 hydrocarbon group), mentioned above in explaining the active methylene-type blocked polyisocyanate compound (cb3), with the aforementioned secondary alcohol (cb4).

In this case, $R^7$ of the blocked isocyanate groups in the active methylene-type blocked polyisocyanate compound (cb3-2) is replaced with a group represented by the following formula (VII):

(VII)

(wherein $R^2$, $R^4$ and $R^5$ each independently represent a C1-12 hydrocarbon group, and $R^3$ represents a C1-12 straight-chain or branched alkylene group).

In this case, the obtained active methylene-type blocked polyisocyanate compound (c3) has a blocked isocyanate group represented by the following formula (III):

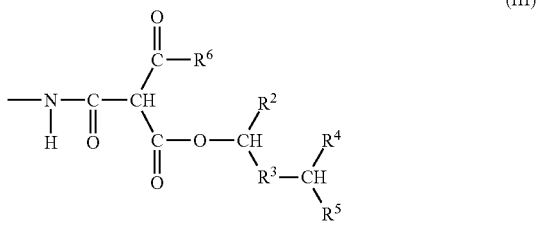

(III)

(wherein $R^2$, $R^3$, $R^4$ and $R^5$ are as defined above, and $R^6$ represents a C1-12 hydrocarbon group).

The reaction between the active methylene-type blocked polyisocyanate compound (cb3-2) and the secondary alcohol (cb4) is not particularly restricted so long as it is a method that, for example, can replace the $R^7$ group of the blocked isocyanate groups in the active methylene-type blocked polyisocyanate compound (cb3-2) with a group represented by formula (VII) above. Preferred among such methods is a method in which some or all of the alcohols derived from the $R^7$ group in the active methylene-type blocked polyisocyanate compound (cb3-2) are distilled out of the system by heating and pressure reduction or the like, and reaction is promoted to obtain an active methylene-type blocked polyisocyanate compound (c3) having a blocked isocyanate group represented by formula (III) above.

Specifically, as the production method, some or all of the alcohol may be removed by 5 minutes to 20 hours and preferably 10 minutes to 10 hours at a temperature of 20° C. to 150° C. and preferably 75° C. to 95° C., under reduced pressure if necessary. If the temperature is too low the exchange reaction of the alkoxy groups in the active methylene-type blocked polyisocyanate compound (cb3-2) will be slow, lowering the production efficiency, while if it is too high, the active methylene-type blocked polyisocyanate compound (c3) may violently decompose and degrade, sometimes lowering the curability.

Also, the mixing proportion of the active methylene-type blocked polyisocyanate compound (cb3) and the secondary alcohol (cb4) for production of the active methylene-type blocked polyisocyanate compound (c3) is preferably in the range of 5 to 500 parts by mass and more preferably in the range of 10 to 200 parts by mass for the secondary alcohol (cb4), based on 100 parts by mass of solid content of the active methylene-type blocked polyisocyanate compound (cb3), from the viewpoint of reactivity of the active methylene-type blocked polyisocyanate compound (c3) that is to be obtained, and production efficiency. At less than 5 parts by mass, the reaction rate between the active methylene-type blocked polyisocyanate compound (cb3) and the secondary alcohol (cb4) will be too slow. Also, if it is greater than 500 parts by mass, the concentration of the active methylene-type blocked polyisocyanate compound (C3) will be too low, potentially lowering the production efficiency.

Also, for the reaction between the active methylene-type blocked polyisocyanate compound (cb3) and the secondary alcohol (cb4), the removal procedure described above may be carried out after adding the polyfunctional hydroxyl group-containing compound to the active methylene-type blocked polyisocyanate compound (cb3) and secondary alcohol (cb4), in order to adjust the molecular weight of the active methylene-type blocked polyisocyanate compound (c3).

The number-average molecular weight of the active methylene-type blocked polyisocyanate compound (c3) is preferably in the range of 600 to 30,000, from the viewpoint of compatibility with the other coating material components, and the smoothness, distinctness of image, water resistance and chipping resistance of the multilayer coating film that is to be formed. The upper limit for the number-average molecular weight is more preferably 10,000 and even more preferably 5,000 from the viewpoint of compatibility with the other coating material components and smoothness and distinctness of image of the multilayer coating film that is to be formed. The lower limit is more preferably 900 and even more preferably 1,000, from the viewpoint of the water resistance and chipping resistance of the multilayer coating film that is to be formed.

The multilayer coating film formed using a water-based coating composition containing the active methylene-type blocked polyisocyanate compound (c3) has satisfactory smoothness, distinctness of image and water resistance, and also excellent curability at low temperature (70° C. or higher and below 120° C.). The reason for the satisfactory smoothness and distinctness of image is conjectured to be that the active methylene-type blocked polyisocyanate compound (c3) has a hydrocarbon group with a specific branched structure, and therefore when the water-based second pigmented coating material (B) is applied onto the uncured first pigmented coating film obtained by applying the water-based first pigmented coating material (A), to obtain the second pigmented coating film, layer mixing between the coating films is inhibited. In addition, since the active methylene-type blocked polyisocyanate compound (c3') with a hydrophilic group often has high storage stability, the curability and water resistance after long-term storage are satisfactory.

The water-based coating composition of the invention includes an acrylic resin emulsion (a), coating film-forming resin (b) and curing agent (c) at 7 to 60 mass %, 10 to 60 mass % and 10 to 50 mass %, preferably 10 to 60 mass %, 10 to 60 mass % and 10 to 50 mass %, more preferably 10 to 55 mass %, 15 to 55 mass % and 15 to 45 mass %, even more preferably 15 to 55 mass %, 15 to 55 mass % and 15 to 45 mass %, yet more preferably 20 to 50 mass %, 20 to 50 mass % and 20 to 40 mass % and even yet more preferably 12 to 50 mass %, 20 to 50 mass % and 20 to 40 mass %, respectively, based on the total mass of the solid resin content in the water-based coating composition. This is from the viewpoint of improving the smoothness, distinctness of image, water resistance and chipping resistance of the multilayer coating film.

The water-based coating composition of the invention may be a one-pack type coating material, or it may be a multipack coating material used by mixing a base compound including an acrylic resin emulsion (a) and a coating film-forming resin (b), and a curing agent (c) and other components, prior to coating.

Also, from the viewpoint of smoothness and distinctness of image of the coating film that is to be obtained, the coating film absorption percentage, of the predried coating film of the water-based coating composition of the invention, is in the range of no greater than 40 mass %, preferably 12 to 40 mass % and even more preferably 16 to 38 mass %.

The coating film absorption percentage can be calculated, for example, by the following test method and formula.

The water-based first pigmented coating material (A) is spray coated onto two aluminum foils: aluminum foil A and aluminum foil B, to a dry film thickness of 20 µm. These are predried at 80° C. for 5 minutes, and the aluminum foil B is immersed in purified water for 2 minutes. Aluminum foils A and B are then dried at 140° C. for 20 minutes.

The masses and nonvolatile contents of the aluminum foils are specified for this series of steps, and the coating film absorption percentage is calculated.

Initial mass of aluminum foil A: $\alpha 0$
Mass of aluminum foil A after predrying: $\alpha 1$
Mass of aluminum foil A after baking: $\alpha 3$
Nonvolatile content (%) of aluminum foil A after predrying: $\alpha 4$ $$\alpha 4=[(\alpha 3-\alpha 0)/(\alpha 1-\alpha 0)]\times 100$$

Initial mass of aluminum foil B: $\beta 0$
Mass of aluminum foil B after predrying: $\beta 1$
Mass of aluminum foil B after water soaking: $\beta 2$
Mass of aluminum foil B after baking: $\beta 3$
Nonvolatile content (%) of coating film on aluminum foil B after water soaking: $\beta 5$ $$\beta 5=[((\beta 3-\beta 0)/(\beta 2-\beta 0)]\times 100$$

Coating film absorption percentage (%): $\gamma$ $$\gamma=[1-(\beta 5/\alpha 4)]\times 100$$

In order to control the coating film absorption percentage to no greater than 40 mass %, the acrylic resin emulsion (a) in the water-based coating composition of the invention has a core-shell structure where the core section is crosslinked, and it is effective for the hydroxyl value of the core section and shell section to be in the range of 50 to 200 mgKOH/g. Furthermore, it is effective if the acid value of the acrylic resin emulsion (a) is in the range of 5 to 25 mgKOH/g, the glass transition temperature (Tg) of the core section is 20° C. or higher, the hydrophobic monomer is copolymerized in the range of 30 to 90 mass % in the core section, and a blocked polyisocyanate compound (c2) is present as the curing agent (c) of the water-based coating composition. As a result, layer mixing between the first pigmented coating film and the second pigmented coating film is inhibited, and it is possible to obtain a multilayer coating film having more excellent smoothness, distinctness of image and flip-flop properties.

The water-based coating composition of the invention may comprise a color pigment and/or an extender pigment commonly used in the field of coating materials. Examples of color pigments include titanium dioxide, zinc oxide, zinc phosphate, aluminum phosphate, zinc molybdate, calcium molybdate, Prussian blue, ultramarine blue, cobalt blue, copper phthalocyanine blue, indanthrone blue, synthetic yellow iron oxide, transparent iron oxide red (yellow), bismuth vanadate, titanium yellow, zinc yellow, monoazo yellow, isoindolinone yellow, metal complex azo yellow, quinophthalone yellow, benzimidazolone yellow, iron oxide red, monoazo red quinacridone red, azo lake (Mn salt), quinacridone magenta, anthanthrone orange, dianthraquinonyl red, perylene maroon, quinacridone magenta, perylene red, diketopyrrolopyrrolechromium vermilion, chlorinated phthalocyanine green, brominated phthalocyanine green, pyrazolone orange, benzimidazolone orange, dioxazine violet, perylene violet and the like, and examples of extender pigments include baryta powder, barium sulfate, barium carbonate, calcium carbonate, gypsum, clay, white carbon, diatomaceous earth, talc, magnesium carbonate, alumina white, gloss white, mica powder and the like, any of which may be used alone or in combinations of two or more.

Also, the water-based coating composition of the invention may further comprise, as necessary, common coating material additives such as luster pigments, curing catalysts, ultraviolet absorbers, light stabilizers, antifoaming agents, plasticizers, organic solvents, surface control agents, anti-settling agents, thickening agents and the like, either alone or in combinations of two or more.

Examples of luster pigments include aluminum, copper, zinc, brass, nickel, aluminum oxide, mica, titanium oxide- or iron oxide-covered aluminum oxide, titanium oxide- or iron oxide-covered mica, glass flakes, hologram pigments and the like, and examples of curing catalysts include organometallic compounds such as tin octylate, dibutyltin di(2-ethyl hexanoate), dioctyltin di(2-ethylhexanoate), dioctyltin diacetate, dibutyltin dilaurate, dibutyltin oxide, monobutyltin trioctate, lead 2-ethylhexylate and zinc octylate.

Examples for the thickening agent include inorganic thickening agents such as silicates, metal silicates, montmorillonite and colloidal alumina; polyacrylic acid-based thickening agents such as copolymers of (meth)acrylic acids and (meth)acrylic acid esters and sodium polyacrylate; associative thickening agents having a hydrophilic portion and a hydrophobic portion in the molecule and exhibiting an effective thickening effect when the hydrophobic portion is adsorbed onto the pigment in the coating material and/or the emulsion particle surfaces in aqueous medium, such that the hydrophobic portions become associated together; cellulosic derivative-based thickening agents such as carboxymethyl cellulose, methyl cellulose and hydroxyethyl cellulose; protein-based thickening agents such as casein, sodium caseinate and ammonium caseinate; alginic acid-based thickening agents such as sodium alginate; polyvinyl-based thickening agents such as polyvinyl alcohol, polyvinylpyrrolidone and polyvinylbenzyl ether copolymer; polyether-based thickening agents such as Pluronic polyethers, polyether dialkyl esters, polyether dialkyl ethers and polyether epoxy-modified compounds; maleic anhydride copolymer-based thickening agents such as partial esters of vinyl methyl ether-maleic anhydride copolymers; and polyamide-based thickening agents such as polyamide amine salts. These thickening agents may be used alone or in combinations of two or more.

Commercial products may be used as polyacrylic acid-based thickening agents. Examples of trade names of commercial products include "PRIMAL ASE-60", "PRIMAL TT-615" and "PRIMAL RM-5" by Rohm & Haas, and "SN THICKENER 613", "SN THICKENER 618", "SN THICKENER 630", "SN THICKENER 634" and "SN THICKENER 636" by San Nopco, Ltd.

A commercial product may also be used as the aforementioned associative thickening agent. Examples of trade names of commercial products include "UH-420", "UH-450", "UH-462", "UH-472", "UH-540", "UH-752", "UH-756VF" and "UH-814N" by Adeka Corp., "PRIMAL RM-8W", "PRIMAL RM-825", "PRIMAL RM-2020NPR", "PRIMAL RM-12W" and "PRIMAL SCT-275" by Rohm & Haas, and "SN THICKENER 612", "SN THICKENER 621N", "SN THICKENER 625N", "SN THICKENER 627N" and "SN THICKENER 660T" by San Nopco, Ltd.

The thickening agent is preferably a polyacrylic acid-based thickening agent and/or associative thickening agent, with associative thickening agents being more preferably used, and urethane associative thickening agents having hydrophobic groups on the ends and containing urethane bonds in the molecular chain being even more preferably used. Commercial products may be used as urethane associative thickening agents. Examples of trade names of commercial products include "UH-420", "UH-462", "UH-472", "UH-540", "UH-752", "UH-756VF" and "UH-814N" by Adeka Corp., and "SN THICKENER 612", "SN THICKENER 621N", "SN THICKENER 625N", "SN THICKENER 627N" and "SN THICKENER 660T" by San Nopco, Ltd.

Also, when the water-based coating composition of the invention comprises the aforementioned thickening agent, the thickening agent content is preferably 0.01 to 10 parts by mass, more preferably 0.02 to 3 parts by mass and even more preferably 0.03 to 2 parts by mass, with respect to 100 parts by mass as the total solid resin content.

[Article to be Coated]

Base materials to which the water-based coating composition of the invention may be applied are not particularly restricted, and examples include metals such as iron, aluminum, brass, copper, tin, stainless steel, galvanized steel and alloyed zinc (such as Zn—Al, Zn—Ni and Zn—Fe)-plated steel and the like; resins such as polyethylene resins, polypropylene resins, acrylonitrile-butadiene-styrene (ABS) resins, polyamide resins, acrylic resins, vinylidene chloride resins, polycarbonate resins, polyurethane resins and epoxy resins, plastic materials such as various FRP materials; inorganic materials such as glass, cement and concrete; wood materials; fiber materials (such as paper and fabrics), and the like, among which metals and plastic materials are preferred.

Also, there are no particular restrictions on articles to be coated by application of the water-based coating composition of the invention, and there may be mentioned external platings of automobile bodies of passenger vehicles, trucks, motorcycles and buses; automobile parts; and external platings of consumer electric products such as cellular phones or audio devices, among which external platings of automobile bodies and automobile parts are preferred.

The article to be coated may also be an article that is a metal base material or has a metal surface such as a car body formed thereof, and that has been surface-treated by phosphate treatment, chromate treatment or complex oxide treatment. Furthermore, the article to be coated may be one having an undercoat film of any of various electrodeposition coatings formed on the aforementioned metal base material, car body or the like, and most preferably it is a car body having an undercoat film formed by a cationic electrodeposition coating.

[Step (1)]

The water-based coating composition of the invention may be applied as a water-based first pigmented coating material (A) to an article to be coated by a known method such as air spraying, airless spraying, rotary atomizing coating or the like, and electrostatic application may be carried out during the coating. The coating film thickness may be in a range of usually 10 to 100 μm, preferably 10 to 50 μm and more preferably 15 to 35 μm, as the dry film thickness.

[Step (2)]

A water-based second pigmented coating material (B) may be further applied onto the first pigmented coating film that has been formed in this manner.

From the viewpoint of prevention of dripping and smoothness of the coating film that is to be obtained, application of the water-based second pigmented coating material (B) is preferably carried out while the solid content of the first pigmented coating film is in the range of 70 to 100 mass %, preferably 80 to 100 mass % and more preferably 90 to 100 mass %, and from the viewpoint of smoothness of the coating film that is to be obtained, it is preferably carried out while the gel fraction of the first pigmented coating film is 0 to 30 mass %, preferably 0.01 to 20 mass % and more preferably 1 to 15 mass %.

The solid content and gel fraction of the first pigmented coating film can be adjusted, for example, by predrying (preheating) and/or air blowing or the like, before application of the water-based second pigmented coating material (B).

The predrying can usually be accomplished by direct or indirect heating of the coated article in a drying furnace for about 1 to 30 minutes at a temperature of about 50° C. to about 110° C. and preferably about 60° C. to about 90° C., while air blowing can usually be accomplished by blasting air at ordinary temperature or heated to a temperature of about 25° C. to about 80° C. onto the coated surface of the article.

The solid content of the first pigmented coating film is measured by the following method.

First, the water-based coating composition of the invention is applied onto an aluminum foil whose mass ($W_1$) has been measured beforehand, simultaneously with the article to be coated. Next, the aluminum foil that has been coated and subjected to predrying as necessary is retrieved just before the water-based second pigmented coating material (B) is applied, and the mass ($W_2$) is measured. The retrieved aluminum foil is then dried at 110° C. for 60 minutes and allowed to cool to room temperature in a desiccator, after which the mass ($W_3$) of the aluminum foil is measured and the solid content is calculated by the following formula.

$$\text{Solid content (mass \%)} = \{(W_3 - W_1)/(W_2 - W_1)\} \times 100$$

The gel fraction of the first pigmented coating film is measured by the following method.

First, the water-based coating composition of the invention is applied onto a polypropylene sheet simultaneously with the article to be coated, and the polypropylene sheet that has been coated and subjected to predrying as necessary, is retrieved just before the water-based second pigmented coating material (B) is applied.

Next, the first pigmented coating film on the polypropylene sheet is retrieved and its mass ($W_a$) is measured. The coating film is then placed in a 200 mesh stainless steel mesh-like container, and extracted while circulating for 5 hours in acetone heated to 64° C., and after drying at 110° C. for 60 minutes, the coating film mass ($W_b$) was measured and the insoluble coating film residue rate (mass %) obtained by the following formula was recorded as the gel fraction.

Gel fraction (mass %)=($W_b/W_a$)×100

As the water-based second pigmented coating material (B) there may be used any known one commonly used for coating of automobile bodies, for example. Specifically, there may be used one having a base resin such as an acrylic resin, polyester resin, alkyd resin, urethane resin or epoxy resin having crosslinkable functional groups such as carboxyl and hydroxyl, and a resin component composed of a crosslinking agent such as an optionally blocked polyisocyanate compound, melamine resin or urea resin, dissolved or dispersed in water together with a pigment and other additives, to form a coating material. Preferred among these are thermosetting water-based coating materials containing hydroxyl group-containing resins and melamine resins.

The pigment component used may be any of the color pigments, luster pigments, extender pigments or the like mentioned above as examples in explaining the water-based coating composition of the invention, and by using a luster pigment as at least one type of pigment component it is possible to form a metallic-like or pearl-like coating film with compactness.

The water-based second pigmented coating material (B) may be applied by a known method such as air spraying, airless spraying, rotary atomizing coating or the like, and electrostatic application may be carried out during the coating. The coating film thickness may be in the range of generally 5 to 40 μm and preferably 10 to 30 μm, as the cured film thickness.

The coating film of the applied water-based second pigmented coating material (B) may be dried by heating for about 1 to 60 minutes at a temperature of about 50° C. to about 110° C. and preferably about 60° C. to about 90° C., using predrying (preheating) and/or air blowing after application.

[Step (3)]

A clear coating material may be further applied onto the first pigmented coating film and second pigmented coating film formed in the manner described above.

The clear coating material used may be any known one commonly used for coating of automobile bodies, for example. Specifically, there may be mentioned organic solvent-based thermosetting coating materials, aqueous thermosetting coating materials and thermosetting powder coating materials comprising, as resin components, base resins such as acrylic resins, polyester resins, alkyd resins, urethane resins, epoxy resins and fluorine resins, that have crosslinkable functional groups such as hydroxyl, carboxyl, epoxy or silanol, and crosslinking agents such as melamine resins, urea resins, non-blocked polyisocyanate compounds, carboxyl group-containing compounds or resins and epoxy group-containing compounds or resins. Preferred among these are thermosetting coating materials comprising a carboxyl group-containing resin and an epoxy group-containing resin, thermosetting coating materials comprising a hydroxyl group-containing resin and a melamine resin, and thermosetting coating materials comprising a hydroxyl group-containing resin and a non-blocked polyisocyanate compound.

The clear coating material may be a one-pack type coating material or it may be a two-pack coating material such as a two-pack urethane resin coating material.

Also, the clear coating material may comprise, if necessary, color pigments, luster pigments, dyes and the like in ranges that do not impair the transparency, and may further contain, as appropriate, extender pigments, ultraviolet absorbers, antifoaming agents, thickening agents, rust-preventive agents, surface control agents and the like.

The clear coating material may be applied onto the coating film surface of the water-based second pigmented coating material (B) by a known method such as air spraying, airless spraying, rotary atomizing coating or the like, and electrostatic application may be carried out during the coating. The clear coating material may be applied to a dry film thickness in the range of 10 to 60 μm and preferably 20 to 50 μm.

[Step (4)]

The multilayer coating film composed of a three-layer coating film consisting of the first pigmented coating film, second pigmented coating film and clear coating film may be simultaneously cured by heating for about 20 to about 40 minutes at a temperature of about 80° C. to about 170° C. and preferably about 120° C. to about 160° C., by hot air heating, infrared heating, high-frequency heating or the like, for example, using common coating film baking means.

EXAMPLES

The present invention will now be described in greater detail by examples, with the understanding that the invention is not limited only to these examples. The "parts" and "%" values refer to "parts by mass" and "mass %".

Production of Acrylic Resin Emulsion (a)

Production Example 1

Into a reactor equipped with a thermometer, thermostat, stirrer, reflux condenser, nitrogen inlet tube and dropper there were charged 130 parts of deionized water and 0.52 part of "AQUALON KH-10" (trade name of Dai-ichi Kogyo Seiyaku Co., Ltd., ammonium salt of polyoxyethylenealkyl ether sulfate, active ingredient: 97%), and these were stirred and mixed under a nitrogen stream and heated to 80° C. Next, 1% of the total monomer emulsion (1) described below and 5.3 parts of a 6% ammonium persulfate aqueous solution were introduced into the reactor, and the mixture was kept at 80° C. for 15 minutes. The remainder of the monomer emulsion (1) was then added dropwise into the reactor kept at the same temperature over a period of 3 hours, and upon completion of the dropwise addition the mixture was aged for 1 hour.

Next, the monomer emulsion (2) described below was added dropwise over a period of 1 hour and aged for 1 hour, and then cooled to 30° C. while gradually adding 40 parts of a 5% 2-(dimethylamino)ethanol aqueous solution to the reactor and discharged while filtering with a 100 mesh nylon cloth, to obtain an aqueous dispersion of an acrylic resin emulsion (a-1) having a mean particle diameter of 118 nm (measured at 20° C. using a "COULTER N4" submicron particle size distribution analyzer (product of Beckman Coulter, Inc.) after dilution with deionized water) and a solid concentration of 30%. The obtained acrylic resin emulsion had a hydroxyl value of 65 mgKOH/g (core copolymer hydroxyl value: 65 mgKOH/g, shell copolymer hydroxyl value: 65 mgKOH/g), an acid value of 13 mgKOH/g and a glass transition temperature of 37° C.

Monomer Emulsion (1):

Monomer emulsion (1) was obtained by mixing and stirring 46.2 parts of deionized water, 0.79 part of "AQUALON KH-10", 7.7 parts of styrene, 16.94 parts of methyl methacrylate, 7.7 parts of n-butyl acrylate, 30.8 parts of n-butyl methacrylate, 11.55 parts of 2-hydroxyethyl methacrylate and 2.31 parts of ethyleneglycol dimethacrylate. (Total of core copolymer-forming monomers: 77 parts)

Monomer Emulsion (2):

Monomer emulsion (2) was obtained by mixing and stirring 13.8 parts of deionized water, 0.24 part of "AQUALON KH-10", 0.03 part of ammonium persulfate, 2.3 parts of styrene, 6.9 parts of methyl methacrylate, 4.6 parts of ethyl acrylate, 3.68 parts of n-butyl acrylate, 3.45 parts of 2-hydroxyethyl methacrylate and 2.07 parts of methacrylic acid. (Total of shell copolymer-forming monomers: 23 parts)

Production Examples 2 to 20

Acrylic resin emulsions (a-2) to (a-20) were obtained in the same manner as Production Example 1, except for changing the compositions of monomer emulsions (1) and (2) as shown in Table 1 below.

Table 1 shows the monomer compositions (parts), hydroxyl values (mgKOH/g), acid values (mgKOH/g) and glass transition temperatures (Tg) (° C.) of acrylic resin emulsions (a-1) to (a-20). The monomer compositions in the table are all values for the monomer components.

TABLE 1

| | | Prod. Ex. 1 | Prod. Ex. 2 | Prod. Ex. 3 | Prod. Ex. 4 | Prod. Ex. 5 | Prod. Ex. 6 | Prod. Ex. 7 | Prod. Ex. 8 | Prod. Ex. 9 | Prod. Ex. 10 |
|---|---|---|---|---|---|---|---|---|---|---|---|
| Acrylic resin emulsion (a) No. | | a-1 | a-2 | a-3 | a-4 | a-5 | a-6 | a-7 | a-8 | a-9 | a-10 |
| Core section copolymer (I) | St | 7.7 | 7.7 | 9.2 | 5.4 | 9.2 | 6.2 | 9.0 | 6.0 | 6.2 | 7.7 |
| | MMA | 16.9 | 9.2 | 15.4 | 23.1 | 15.4 | 18.3 | 19.8 | 13.2 | 32.3 | 24.8 |
| | EA | 0.0 | 0.0 | 1.5 | 0.0 | 0.0 | 0.0 | 0.0 | 0.0 | 0.0 | 19.3 |
| | nBA | 7.7 | 7.7 | 6.2 | 11.6 | 9.2 | 7.7 | 18.0 | 9.0 | 9.2 | 3.9 |
| | nBMA | 30.8 | 23.1 | 30.0 | 11.6 | 29.3 | 31.6 | 27.0 | 20.4 | 15.4 | 7.7 |
| | 2EHA | 0.0 | 15.4 | 0.0 | 0.0 | 0.0 | 0.0 | 0.0 | 0.0 | 0.0 | 0.0 |
| | HEA | 0.0 | 0.0 | 0.0 | 11.6 | 0.0 | 0.0 | 0.0 | 0.0 | 0.0 | 0.0 |
| | HEMA | 11.6 | 11.6 | 11.6 | 11.6 | 11.6 | 10.8 | 13.5 | 9.6 | 11.6 | 11.6 |
| | AMA | 0.0 | 0.0 | 2.3 | 0.0 | 0.0 | 0.0 | 0.0 | 0.0 | 0.0 | 0.0 |
| | EGDMA | 2.3 | 2.3 | 0.8 | 2.3 | 2.3 | 2.5 | 2.7 | 1.8 | 2.3 | 2.2 |
| | Total | 77 | 77 | 77 | 77 | 77 | 77 | 90 | 60 | 77 | 77 |
| Shell section copolymer (II) | St | 2.3 | 3.5 | 2.3 | 2.8 | 2.8 | 2.3 | 1.0 | 4.0 | 2.3 | 3.5 |
| | MMA | 6.9 | 10.4 | 6.4 | 6.4 | 4.1 | 2.3 | 2.0 | 13.6 | 11.5 | 5.8 |
| | EA | 4.6 | 2.3 | 4.1 | 4.6 | 3.5 | 1.4 | 2.0 | 8.0 | 2.2 | 4.6 |
| | nBA | 3.7 | 1.4 | 4.1 | 3.6 | 3.7 | 6.9 | 2.1 | 6.4 | 1.4 | 3.7 |
| | nBMA | 0.0 | 0.0 | 0.5 | 0.0 | 0.0 | 4.6 | 0.0 | 0.0 | 0.0 | 0.0 |
| | HEA | 0.0 | 0.0 | 0.0 | 0.0 | 3.5 | 0.0 | 0.0 | 0.0 | 0.0 | 0.0 |
| | HEMA | 3.5 | 3.5 | 3.5 | 3.5 | 3.5 | 3.5 | 1.5 | 6.0 | 3.6 | 3.5 |
| | MAAc | 2.1 | 2.0 | 2.1 | 2.1 | 2.1 | 2.1 | 1.4 | 2.0 | 2.1 | 2.1 |
| | EGDMA | 0.0 | 0.0 | 0.0 | 0.0 | 0.0 | 0.0 | 0.0 | 0.0 | 0.0 | 0.0 |
| | Total | 23 | 23 | 23 | 23 | 23 | 23 | 10 | 40 | 23 | 23 |
| Core/shell ratio (solid mass ratio) | | 77/23 | 77/23 | 77/23 | 77/23 | 77/23 | 77/23 | 90/10 | 60/40 | 77/23 | 77/23 |
| Hydroxyl value (mgKOH/g) | Core section copolymer | 65 | 65 | 65 | 137 | 65 | 60 | 65 | 69 | 65 | 65 |
| | Shell section copolymer | 65 | 65 | 65 | 65 | 137 | 65 | 65 | 65 | 67 | 65 |
| | Overall | 65 | 65 | 65 | 121 | 81 | 61 | 65 | 67 | 65 | 65 |
| Acid value (mgKOH/g) | | 13 | 13 | 13 | 14 | 13 | 13 | 9 | 13 | 13 | 13 |
| Glass transition temperature (° C.) | | 37 | 22 | 37 | 22 | 30 | 31 | 26 | 33 | 54 | 36 |

| | | Prod. Ex. 11 | Prod. Ex. 12 | Prod. Ex. 13 | Prod. Ex. 14 | Prod. Ex. 15 | Prod. Ex. 16 | Prod. Ex. 17 | Prod. Ex. 18 | Prod. Ex. 19 | Prod. Ex. 20 |
|---|---|---|---|---|---|---|---|---|---|---|---|
| Acrylic resin emulsion (a) No. | | a-11 | a-12 | a-13 | a-14 | a-15 | a-16 | a-17 | a-18 | a-19 | a-20 |
| Core section copolymer (I) | St | 9.2 | 6.2 | 10.0 | 9.2 | 9.2 | 7.7 | 3.9 | 7.7 | 7.7 | 7.7 |
| | MMA | 15.4 | 18.5 | 25.0 | 15.4 | 15.4 | 16.9 | 10.8 | 17.7 | 15.4 | 16.9 |
| | EA | 0.0 | 0.0 | 2.0 | 0.0 | 0.0 | 0.0 | 0.0 | 1.5 | 0.0 | 0.0 |
| | nBA | 7.7 | 15.4 | 10.0 | 7.7 | 7.7 | 11.6 | 7.7 | 7.7 | 7.7 | 7.7 |
| | nBMA | 30.8 | 15.4 | 35.0 | 36.2 | 36.2 | 27.0 | 13.9 | 30.8 | 25.4 | 30.8 |
| | 2EHA | 0.0 | 7.7 | 0.0 | 0.0 | 0.0 | 0.0 | 0.0 | 0.0 | 0.0 | 0.0 |
| | HEA | 0.0 | 0.0 | 3.0 | 0.0 | 0.0 | 0.0 | 0.0 | 0.0 | 0.0 | 0.0 |
| | HEMA | 11.6 | 11.6 | 15.0 | 6.2 | 6.2 | 11.6 | 38.5 | 11.6 | 11.6 | 11.6 |
| | AMA | 0.0 | 0.0 | 0.0 | 0.0 | 0.0 | 0.0 | 0.0 | 0.0 | 9.2 | 0.0 |
| | EGDMA | 2.3 | 2.3 | 0.0 | 2.3 | 2.3 | 2.3 | 2.3 | 0.0 | 0.0 | 2.3 |
| | Total | 77 | 77 | 100 | 77 | 77 | 77 | 77 | 77 | 77 | 77 |

TABLE 1-continued

| | | Production Example No. | | | | | | | | | |
|---|---|---|---|---|---|---|---|---|---|---|---|
| Shell section copolymer (II) | St | 1.8 | 2.3 | 0.0 | 2.3 | 2.3 | 2.3 | 3.5 | 2.3 | 2.3 | 2.3 |
| | MMA | 4.6 | 4.6 | 0.0 | 6.9 | 4.6 | 8.5 | 4.6 | 5.8 | 6.4 | 6.4 |
| | EA | 5.1 | 6.9 | 0.0 | 4.6 | 3.5 | 4.6 | 5.8 | 5.8 | 4.6 | 4.6 |
| | nBA | 3.2 | 3.7 | 0.0 | 3.7 | 3.7 | 3.7 | 3.7 | 3.5 | 3.6 | 3.7 |
| | nBMA | 0.9 | 0.0 | 0.0 | 0.0 | 0.0 | 0.0 | 0.0 | 0.0 | 0.5 | 0.0 |
| | HEA | 0.0 | 0.0 | 0.0 | 0.0 | 0.0 | 0.0 | 0.0 | 0.0 | 0.0 | 0.0 |
| | HEMA | 3.5 | 3.5 | 0.0 | 3.5 | 6.9 | 1.8 | 3.5 | 3.7 | 3.5 | 3.5 |
| | MAAc | 3.9 | 2.1 | 0.0 | 2.1 | 2.1 | 2.1 | 2.1 | 2.1 | 2.1 | 2.1 |
| | EGDMA | 0.0 | 0.0 | 0.0 | 0.0 | 0.0 | 0.0 | 0.0 | 0.0 | 0.0 | 0.5 |
| | Total | 23 | 23 | 0 | 23 | 23 | 23 | 23 | 23 | 23 | 23 |
| Core/shell ratio (solid mass ratio) | | 77/23 | 77/23 | 100/0 | 77/23 | 77/23 | 77/23 | 77/23 | 77/23 | 77/23 | 77/23 |
| Hydroxyl value (mgKOH/g) | Core section copolymer | 65 | 65 | 79 | 35 | 35 | 65 | 216 | 65 | 65 | 65 |
| | Shell section copolymer | 65 | 65 | 0 | 65 | 130 | 35 | 65 | 69 | 65 | 65 |
| | Overall | 65 | 65 | 79 | 42 | 56 | 58 | 181 | 66 | 65 | 65 |
| Acid value (mgKOH/g) | | 26 | 13 | 20 | 13 | 13 | 13 | 13 | 13 | 14 | 13 |
| Glass transition temperature (° C.) | | 38 | 18 | 42 | 35 | 35 | 33 | 38 | 35 | 37 | 37 |

The abbreviations in Table 1 have the following meanings.
St: Styrene
MMA: Methyl methacrylate
EA: Ethyl acrylate
nBA: n-Butyl acrylate
nBMA: n-Butyl methacrylate
HEA: 2-Hydroxyethyl acrylate
HEMA: 2-Hydroxyethyl methacrylate
MAAc: Methacrylic acid
AMA: Allyl methacrylate
EGDMA: Ethyleneglycol dimethacrylate Production of Coating Film-Forming Resin (b1)

Production Example 21

Into a reactor equipped with a thermometer, thermostat, stirrer, reflux condenser and water separator there were charged 142 parts of isophthalic acid, 313 parts of adipic acid, 59 parts of methylpentanediol, 220 parts of trimethylolpropane and 228 parts of butylethylpropanediol, and after heating from 160° C. to 230° C. over a period of 3 hours, the condensation water produced was distilled off with a water separator while maintaining a temperature of 230° C., and reaction was conducted until the acid value fell below 3 mgKOH/g. To this reaction product there was added 38 parts of trimellitic anhydride, and after addition reaction at 170° C. for 30 minutes, it was cooled to below 50° C., 2-(dimethylamino)ethanol was added in an amount equivalent to the acid groups for neutralization, and then deionized water was slowly added to obtain a hydroxyl group-containing polyester resin (b1-1) solution with a solid concentration of 45% and at pH 6.3. The acid value of the obtained hydroxyl group-containing polyester resin (b1-1) was 35 mgKOH/g, the hydroxyl value was 164 mgKOH/g and the number-average molecular weight was 1600.

Production of Coating Film-Forming Resin (b2)

Production Example 22

Into a reactor equipped with a thermometer, thermostat, stirrer, reflux condenser, nitrogen inlet tube and dropper there was charged 30 parts of propyleneglycol monopropyl ether, and after raising the temperature to 95° C., a mixture of 10 parts of styrene, 30 parts of methyl methacrylate, 25 parts of 2-ethylhexyl acrylate, 11.5 parts of n-butyl acrylate, 20 parts of hydroxyethyl acrylate, 3.5 parts of acrylic acid, 10 parts of propyleneglycol monopropyl ether and 2 parts of 2,2'-azobis(2,4-dimethylvaleronitrile) was added dropwise over a period of 4 hours, and upon completion of the dropwise addition the mixture was aged for 1 hour. Next, a mixture of 5 parts of propyleneglycol monopropyl ether and 1 part of 2,2'-azobis(2,4-dimethylvaleronitrile) was further added dropwise into a flask over a period of 1 hour, and upon completion of the dropwise addition the mixture was aged for 1 hour. There was further added 3.03 parts of 2-(dimethylamino)ethanol, and deionized water was slowly added thereto to obtain a solution of a hydroxyl group-containing water-soluble acrylic resin (b2-1) with a solid concentration of 40%. The acid value of the obtained hydroxyl group-containing acrylic resin was 27 mgKOH/g, the hydroxyl value was 97 mgKOH/g, and the weight-average molecular weight was approximately 50,000.

Production of Active Methylene-Type Blocked Polyisocyanate Compound (c3)

Production Example 23

After charging 360 parts of "SUMIDUR N-3300", 60 parts of "UNIOX M-550" (product of NOF Corp., polyethyleneglycol monomethyl ether, average molecular weight: approximately 550) and 0.2 part of 2,6-di-tert-butyl-4-methylphenol into a reactor equipped with a thermometer, thermostat, stirrer, reflux condenser, nitrogen inlet tube, dropper and simple removed solvent trap, the contents were thoroughly mixed and heated at 130° C. for 3 hours under a nitrogen stream. Next, 110 parts of ethyl acetate and 252 parts of diisopropyl malonate were charged in, 3 parts of a 28% methanol solution of sodium methoxide was added while stirring under a nitrogen stream, and stirring was continued at 65° C. for 8 hours. The isocyanate content in the obtained resin solution was 0.12 mol/Kg. After adding 683 parts of 4-methyl-2-pentanol to this, the solvent was distilled off over a period of 3 hours under reduced pressure conditions, while keeping the system temperature at 80° C.

to 85° C., to obtain 1010 parts of a solution of an active methylene-type blocked polyisocyanate compound (c3-1). The simple trap for the removed solvent included 95 parts of isopropanol. The solid concentration of the obtained solution of the active methylene-type blocked polyisocyanate compound (c3-1) was approximately 60%.

Production Example 24

After charging 480 parts of "SUMIDUR N-3300" (trade name of Sumika Bayer Urethane Co., Ltd., polyisocyanate containing isocyanurate structure derived from hexamethylene diisocyanate, solid content: approximately 100%, isocyanate group content: 21.8%), 150 parts of ethyl acetate and 365 parts of diisopropyl malonate into a reactor equipped with a thermometer, thermostat, stirrer, reflux condenser, nitrogen inlet tube, dropper and simple removed solvent trap, 4 parts of a 28% sodium methoxide methanol solution was added while stirring under a nitrogen stream and the mixture was stirred at 65° C. for 8 hours. The isocyanate content in the obtained resin solution was 0.07 mol/Kg. To this there was added 870 parts of 4-methyl-2-pentanol, the solvent was distilled off over a period of 3 hours under reduced pressure conditions while maintaining a system temperature of 90° C. to 95° C., and 120 parts of 4-methyl-2-pentanol was further added to obtain 1400 parts of a solution of an active methylene-type blocked polyisocyanate compound (c3-2). The simple trap for the removed solvent included 183 parts of isopropanol. The solid concentration of the obtained solution of the active methylene-type blocked polyisocyanate compound (c3-2) was approximately 60%.

Production Example 25

After charging 480 parts of "SUMIDUR N-3300", 150 parts of ethyl acetate and 310 parts of diethyl malonate into a reactor equipped with a thermometer, thermostat, stirrer, reflux condenser, nitrogen inlet tube, dropper and simple removed solvent trap, 4 parts of a 28% sodium methoxide methanol solution was added while stirring under a nitrogen stream and the mixture was stirred at 65° C. for 8 hours. The isocyanate content in the obtained resin solution was 0.06 mol/Kg. To this there was added 630 parts of n-butanol, the solvent was distilled off over a period of 3 hours under reduced pressure conditions while maintaining a system temperature of 90° C. to 95° C., and 90 parts of n-butanol was added to obtain 1270 parts of a solution of an active methylene-type blocked polyisocyanate compound (c3-3). The simple trap for the removed solvent included 100 parts of ethanol. The solid concentration of the obtained solution of the active methylene-type blocked polyisocyanate compound (c3-3) was approximately 60%.

Production of Water-Based First Pigmented Coating Material (A)

Example 1

After mixing 25 parts of the solution of the hydroxyl group-containing water-soluble acrylic resin (b2-1) obtained in Production Example 22 (solid resin content: 10 parts), 60 parts of "JR-806" (trade name of Tayca Corp., rutile titanium dioxide), 1 part of "CARBON MA-100" (trade name of Mitsubishi Chemical Corp., carbon black), 15 parts of "BARIACE B-35" (trade name of Sakai Chemical Industry Co., Ltd., barium sulfate powder, mean primary particle size: 0.5 μm), 3 parts of "MICRO ACE S-3" (trade name of Nippon Talc Co., Ltd., talc powder, mean primary particle size: 4.8 μm) and 46 parts of deionized water, and adjusting the mixture to pH 8.0 with 2-(dimethylamino)ethanol, it was dispersed for 30 minutes with a paint shaker to obtain a pigment-dispersed paste.

Next, 150 parts of the obtained pigment-dispersed paste (solid resin content: 10 parts), 100 parts of the acrylic resin emulsion (a-1) dispersion obtained in Production Example 1 (solid resin content: 30 parts), 44.4 parts of the hydroxyl group-containing polyester resin (b1-1) solution obtained in Production Example 21 (solid resin content: 20 parts), 28.6 parts of (UCOAT UX-8100" (trade name of Sanyo Chemical Industries, Ltd., urethane emulsion, solid content: 35%) (solid resin content: 10 parts), 25 parts of the blocked polyisocyanate compound (c3-1) solution obtained in Production Example 23 (solid resin content: 15 parts), 15 parts of the melamine resin "SAIMEL 350" (trade name of Mitsui Saitech Co., Ltd., methyl etherified melamine resin, weight-average molecular weight: 550, solid content: 100%) (solid resin content: 15 parts) and 10 parts of 2-ethyl-1-hexanol were uniformly mixed.

To the obtained mixture there was then added "UH-752" (trade name of Adeka Corp., urethane associative thickening agent), 2-(dimethylamino)ethanol and deionized water, to obtain water-based first pigmented coating material (A-1) having pH 8.0, a solid concentration of 48%, and a viscosity of 30 seconds with a Ford cup No. 4 at 20° C.

Examples 2 to 17, Comparative Examples 1 to 11

Water-based first pigmented coating materials (A-2) to (A-28), each having pH 8.0 and a viscosity of 30 seconds with a Ford cup No. 4 at 20° C., were obtained in the same manner as Example 1, except that the mixing compositions were as shown in Table 2 below. The contents in the table are all solid contents.

TABLE 2

| | | | Example No. | | | | | | | | |
|---|---|---|---|---|---|---|---|---|---|---|---|
| | | | Example 1 | Example 2 | Example 3 | Example 4 | Example 5 | Example 6 | Example 7 | Example 8 | Example 9 |
| Water-based first pigmented coating material (A) No. | | | A-1 | A-2 | A-3 | A-4 | A-5 | A-6 | A-7 | A-8 | A-9 |
| Acrylic resin emulsion (a) | No. | | a-1 | a-2 | a-3 | a-4 | a-5 | a-6 | a-7 | a-8 | a-9 |
| | Amount | | 30 | 32 | 30 | 34 | 30 | 32 | 30 | 28 | 30 |
| Coating film-forming | Polyester-resin (b1) | b1-1 | 20 | 16 | 22 | 16 | 20 | 20 | 18 | 19 | 18 |

TABLE 2-continued

| | | | | | | | | | | | |
|---|---|---|---|---|---|---|---|---|---|---|---|
| ing resin (b) | Water-soluble acrylic resin (b2) | b2-1 | 10 | 12 | 10 | 10 | 12 | 10 | 10 | 13 | 11 |
| | Urethane resin (b3) | UX-8100 | 10 | 10 | 8 | 10 | 8 | 8 | 12 | 10 | 11 |
| | Total coating film-forming resin (b) amount | | 40 | 38 | 40 | 36 | 40 | 38 | 40 | 42 | 40 |
| Curing agent (c) | Melamine resin (c1) | SAIMEL 350 | 15 | 14 | 15 | 15 | 15 | 15 | 16 | 15 | 15 |
| | | SAIMEL 250 (*2) | — | — | — | — | — | — | — | — | — |
| | Active methylenic block polyisocyanate compound (c3) | c3-1 | 15 | 16 | 15 | 15 | 15 | 15 | 14 | 15 | 15 |
| | | c3-2 | — | — | — | — | — | — | — | — | — |
| | | c3-3 | — | — | — | — | — | — | — | — | — |
| | Total curing agent (c) amount | | 30 | 30 | 30 | 30 | 30 | 30 | 30 | 30 | 30 |
| Total resin solid portion amount | | | 100 | 100 | 100 | 100 | 100 | 100 | 100 | 100 | 100 |

| | | | Example No. | | | | | | | |
|---|---|---|---|---|---|---|---|---|---|---|
| | | | Example 10 | Example 11 | Example 12 | Example 13 | Example 14 | Example 15 | Example 16 | Example 17 |
| Water-based first pigmented coating material (A) No. | | | A-10 | A-11 | A-12 | A-13 | A-14 | A-15 | A-16 | A-17 |
| Acrylic resin emulsion (a) | No. | | a-1 | a-1 | a-1 | a-1 | a-10 | a-11 | a-12 | a-1 |
| | Amount | | 35 | 30 | 30 | 30 | 30 | 30 | 30 | 10 |
| Coating film-forming resin (b) | Polyester resin (b1) | b1-1 | 20 | 18 | 18 | 18 | 25 | 25 | 25 | 25 |
| | Water-soluble acrylic resin (b2) | b2-1 | 15 | 12 | 12 | 12 | 15 | 15 | 15 | 15 |
| | Urethane resin (b3) | UX-8100 | — | 10 | 10 | 10 | — | — | — | 10 |
| | Total coating film-forming resin (b) amount | | 35 | 40 | 40 | 40 | 40 | 40 | 40 | 50 |
| Curing agent (c) | Melamine resin (c1) | SAIMEL 350 | — | 30 | 15 | 15 | 16 | 15 | 16 | 20 |
| | | SAIMEL 250 (*2) | 15 | — | — | — | — | — | — | — |

TABLE 2-continued

| | | | | | | | | | |
|---|---|---|---|---|---|---|---|---|---|
| Active methylenic block polyisocyanate compound (c3) | c3-1 | 15 | — | — | — | 14 | 15 | 14 | 20 |
| | c3-2 | — | — | 15 | — | — | — | — | — |
| | c3-3 | — | — | — | 15 | — | — | — | — |
| Total curing agent (c) amount | | 30 | 30 | 30 | 30 | 30 | 30 | 30 | 40 |
| Total resin solid portion amount | | 100 | 100 | 100 | 100 | 100 | 100 | 100 | 100 |

| | | | Comp. Ex. No. | | | | | | | | | | |
|---|---|---|---|---|---|---|---|---|---|---|---|---|---|
| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
| Water-based first pigmented coating material (A) No. | | | A-18 | A-19 | A-20 | A-21 | A-22 | A-23 | A-24 | A-25 | A-26 | A-27 | A-28 |
| Acrylic resin emulsion (a) | No. | | a-13 | a-14 | a-15 | a-16 | a-17 | a-18 | a-19 | a-20 | a-1 | a-1 | a-1 |
| | Amount | | 30 | 28 | 28 | 30 | 30 | 30 | 32 | 30 | 42 | 5 | 65 |
| Coating film-forming resin (b) | Polyester resin (b1) | b1-1 | 20 | 20 | 20 | 22 | 20 | 19 | 18 | 20 | 25 | 40 | — |
| | Water-soluble acrylic resin (b2) | b2-1 | 10 | 10 | 10 | 10 | 10 | 11 | 10 | 10 | 15 | 15 | 10 |
| | Urethane resin (b3) | UX-8100 | 10 | 12 | 12 | 8 | 10 | 10 | 10 | 10 | 10 | 10 | — |
| | Total coating film-forming resin (b) amount | | 40 | 42 | 42 | 40 | 40 | 40 | 38 | 40 | 50 | 65 | 10 |
| Curing agent (c) | Melamine resin (c1) | SAIMEL 350 | 15 | 15 | 15 | 13 | 17 | 15 | 15 | 15 | 4 | 15 | 12.5 |
| | | SAIMEL 250 (*2) | — | — | — | — | — | — | — | — | — | — | — |
| | Active methylenic block polyisocyanate compound (c3) | c3-1 | 15 | 15 | 15 | 17 | 13 | 15 | 15 | 15 | 4 | 15 | 12.5 |
| | | c3-2 | — | — | — | — | — | — | — | — | — | — | — |
| | | c3-3 | — | — | — | — | — | — | — | — | — | — | — |
| | Total curing agent (c) amount | | 30 | 30 | 30 | 30 | 30 | 30 | 30 | 30 | 8 | 30 | 25 |
| Total resin solid portion amount | | | 100 | 100 | 100 | 100 | 100 | 100 | 100 | 100 | 100 | 100 | 100 |

(*1): SAIMEL 250:

Trade name of Mitsui Saitech Co., Ltd., methyl/butyl mixed etherified melamine resin, number-average molecular weight: 2,700, solid content: 70%.

Production of Acrylic Resin Emulsion for Water-Based Second Pigmented Coating Material (B)

Production Example 26

After charging 130 parts of deionized water and 0.52 part of AQUALON KH-10 into a reactor equipped with a thermometer, thermostat, stirrer, reflux condenser, nitrogen inlet tube and dropper, the mixture was stirred in a nitrogen stream and the temperature was increased to 80° C. Next, 1% of the total monomer emulsion (1) described below and 5.3 parts of a 6% ammonium persulfate aqueous solution were introduced into the reactor, and the mixture was kept at 80° C. for 15 minutes. The remainder of the monomer emulsion (1) was then added dropwise into the reactor kept at the same temperature over a period of 3 hours, and upon completion of the dropwise addition the mixture was aged for 1 hour. Next, the monomer emulsion (2) described below was added dropwise over a period of 1 hour and aged for 1 hour, and then cooled to 30° C. while gradually adding 40 parts of a 5% dimethylethanolamine aqueous solution to the reactor and discharged while filtering with a 100 mesh nylon cloth, to obtain a dispersion of an acrylic resin emulsion (AC) having a mean particle diameter of 100 nm (measured at 20° C. using a "COULTER N4" submicron particle size distribution analyzer (product of Beckman Coulter, Inc.) after dilution with deionized water) and a solid concentration of 30%. The obtained acrylic resin had an acid value of 33 mgKOH/g and a hydroxyl value of 25 mgKOH/g.

Monomer Emulsion (1):

Monomer emulsion (1) was obtained by mixing and stirring 42 parts of deionized water, 0.72 part of "AQUALON KH-10", 2.1 parts of methylene bisacrylamide, 2.8 parts of styrene, 16.1 parts of methyl methacrylate, 28 parts of ethyl acrylate and 21 parts of n-butyl acrylate.

Monomer Emulsion (2):

Monomer emulsion (2) was obtained by mixing and stirring 18 parts of deionized water, 0.31 part of "AQUALON KH-10", 0.03 part ammonium persulfate, 5.1 parts methacrylic acid, 5.1 parts 2-hydroxyethyl acrylate, 3 parts styrene, 6 parts methyl methacrylate, 1.8 parts ethyl acrylate and 9 parts n-butyl acrylate.

Production of Luster Pigment Dispersion for Water-Based Second Pigmented Coating Material (B)

Production Example 27

In a stirring/mixing vessel there were uniformly mixed 19 parts of the aluminum pigment paste "GX-180A" (trade name of Asahi Kasei Metals Co., Ltd., metal content: 74%), 35 parts 2-ethyl-1-hexanol, 8 parts of a phosphate group-containing resin solution (*2) (solid resin content: 4 parts) and 0.2 part of 2-(dimethylamino)ethanol, to obtain a luster pigment dispersion (AL).

(*2): Phosphate Group-Containing Resin Solution:

In a reactor equipped with a thermometer, thermostat, stirrer, reflux condenser, nitrogen inlet tube and dropper there was placed a mixed solvent of 27.5 parts of methoxypropanol and 27.5 parts of isobutanol, the mixture was heated to 110° C., and then 121.5 parts of a mixture comprising 25 parts of styrene, 27.5 parts of n-butyl methacrylate, 20 parts of "Isostearyl Acrylate" (trade name of Osaka Organic Chemical Industry, Ltd., branched higher alkyl acrylate), 7.5 parts of 4-hydroxybutyl acrylate, 15 parts of a phosphate group-containing polymerizable monomer (*3), 12.5 parts of 2-methacryloyloxyethyl acid phosphate, 10 parts of isobutanol and 4 parts of tert-butyl peroxyoctanoate was added to the mixed solvent over a period of 4 hours, and a mixture comprising 0.5 part of tert-butyl peroxyoctanoate and 20 parts of isopropanol was further added dropwise over a period of 1 hour. The mixture was then aged while stirring for 1 hour to obtain a phosphate group-containing resin solution with a solid concentration of 50%. The acid value due to the phosphate groups of the resin was 83 mgKOH/g, the hydroxyl value was 29 mgKOH/g and the weight-average molecular weight was 10,000.

(*3) Phosphate Group-Containing Polymerizable Monomer:

After placing 57.5 parts of monobutylphosphoric acid and 41 parts of isobutanol in a reactor equipped with a thermometer, thermostat, stirrer, reflux condenser, nitrogen inlet tube and dropper and raising the temperature to 90° C., 42.5 parts of glycidyl methacrylate was added dropwise over a period of 2 hours, and then the mixture was stirred for 1 hour and aged. Next, 59 parts of isopropanol was added to obtain a phosphate group-containing polymerizable monomer solution with a solid concentration of 50%. The acid value due to the phosphate groups in the obtained monomer was 285 mgKOH/g.

Production of Polyester Resin for Water-Based Second Pigmented Coating Material (B)

Production Example 28

After charging 109 parts of trimethylolpropane, 141 parts of 1,6-hexanediol, 126 parts of hexahydrophthalic anhydride and 120 parts of adipic acid into a reactor equipped with a thermometer, thermostat, stirrer, reflux condenser and water separator, and heating between 160° C. and 230° C. for a period of 3 hours, condensation reaction was conducted at 230° C. for 4 hours. Next, 38.3 parts of trimellitic anhydride was further added for addition of carboxyl groups to the obtained condensation reaction product, reaction was conducted at 170° C. for 30 minutes, and then dilution was performed with 2-ethyl-1-hexanol (mass dissolving in 100 g of water at 20° C.: 0.1 g) and 2-(dimethylamino)ethanol was added at 0.5 equivalent with respect to the acid groups, to obtain a polyester resin (PE) solution with a solid concentration of 70%. The obtained polyester resin (PE) had an acid value of 46 mgKOH/g, a hydroxyl value of 150 mgKOH/g and a weight-average molecular weight of 6,400.

Production of Water-Based Second Pigmented Coating Material (B)

Production Example 29

There were uniformly mixed 130 parts of the acrylic resin emulsion (AC) dispersion obtained in Production Example 26 (solid resin content: 39 parts), 38.6 parts of the polyester resin solution (PE) solution obtained in Production Example 28 (solid resin content: 27 parts), 62.2 parts of the luster pigment dispersion (AL) obtained in Production Example 27 (solid resin content: 4 parts), 35 parts of 2-ethyl-1-hexanol and 37.5 parts of "SAIMEL 325" (trade name of Nihon Cytec Industries Inc., melamine resin, solid content: 80%)

(solid resin content: 30 parts), and there were further added "PRIMAL ASE-60" (trade name of Rohm & Haas, polyacrylic acid-based thickening agent), 2-(dimethylamino)ethanol and deionized water, to obtain a water-based second pigmented coating material (B-1) having pH 8.0, a solid concentration of 48% and a viscosity of 60 seconds with a Ford cup No. 4 at 20° C.

[Method of Forming Coating Film]

The water-based first pigmented coating materials (A-1) to (A-28) obtained in Examples 1 to 17 and Comparative Examples 1 to 11 and the water-based second pigmented coating material (B-1) obtained in Production Example 29 were each used to prepare test sheets in the following manner, and subjected to evaluation testing.

(Fabrication of Article to be Coated for Testing)

A cold-rolled steel sheet that had been subjected to zinc phosphate chemical conversion treatment was electrodeposited with "ELECRON GT-10" (trade name of Kansai Paint Co., Ltd., cationic electrodeposition coating) to a dry film thickness of 20 µm, and was heated at 170° C. for 30 minutes for curing to produce an article to be coated for testing.

Example 18

In a coating environment with a temperature of 23° C. and a humidity of 75%, the aforementioned article to be coated for testing and the aforementioned aluminum foil for measurement of the coating film absorption percentage of the coating film, were coated with the water-based first pigmented coating material (A-1) obtained in Example 1 to a dry film thickness of 30 µm, using a rotary atomizing coating machine. Next, predrying (preheating) was carried out at 80° C. for 5 minutes, and then the coating film absorption percentage of the water-based first pigmented coating film was measured. The measurement results are shown in Table 3. The water-based second pigmented coating material (B-1) obtained in Production Example 29 was then applied onto the water-based first pigmented coating film using a rotary atomizing coating machine to a dry film thickness of 15 µm, and predrying (preheating) was carried out at 80° C. for 10 minutes. Next, the aqueous second pigmented coating film was coated with MAGICRON KINO-1210 (trade name of Kansai Paint Co., Ltd., acrylic resin-based solvent-type overcoat clear coating material, hereunder also referred to as "clear coating material (C-1)") to a dry film thickness of 40 µm, and after it was allowed to stand for 7 minutes, it was heated at 140° C. for 30 minutes, and the water-based first pigmented coating film, aqueous second pigmented coating film and clear coating film were simultaneously baked to fabricate a test sheet.

Examples 19 to 34, Comparative Examples 12 to 22

A test sheet was fabricated in the same manner as Example 18, except that the water-based first pigmented coating material (A-1) obtained in Example 1 that was used in Example 18 was changed to the water-based first pigmented coating materials (A-2) to (A-28) listed in Table 3 below.

Each of the test sheets obtained in Examples 18 to 34 and Comparative Examples 12 to 22 were evaluated by the following test methods. The evaluation results are shown in Table 3.

TABLE 3

| Example Comp. Ex. | Water-based first pigmented coating material (A) | Evaluation results | | | | | |
|---|---|---|---|---|---|---|---|
| | | Coating film water absorption (%) | Smoothness | Distinctness of image | FF property | Water resistance | Chipping resistance |
| Example 18 | A-1 | 18 | 11 | 9 | 5 | VG | VG |
| Example 19 | A-2 | 16 | 11 | 10 | 4.5 | VG | G |
| Example 20 | A-3 | 22 | 12 | 10 | 4.5 | VG | G |
| Example 21 | A-4 | 28 | 13 | 12 | 4.5 | VG | VG |
| Example 22 | A-5 | 35 | 13 | 12 | 4.5 | G | VG |
| Example 23 | A-6 | 17 | 11 | 10 | 4.5 | VG | G |
| Example 24 | A-7 | 20 | 13 | 12 | 4 | VG | G |
| Example 25 | A-8 | 30 | 13 | 12 | 4.5 | G | G |
| Example 26 | A-9 | 18 | 13 | 12 | 4.5 | VG | VG |
| Example 27 | A-10 | 17 | 13 | 13 | 4.5 | VG | G |
| Example 28 | A-11 | 38 | 13 | 13 | 4 | G | G |
| Example 29 | A-12 | 25 | 13 | 13 | 4 | G | G |
| Example 30 | A-13 | 29 | 13 | 13 | 4 | G | G |
| Example 31 | A-14 | 37 | 14 | 14 | 4 | VG | G |
| Example 32 | A-15 | 36 | 14 | 14 | 4 | G | G |

TABLE 3-continued

| Example Comp. Ex. | Water-based first pigmented coating material (A) | Coating film water absorption (%) | Smoothness | Distinctness of image | FF property | Water resistance | Chipping resistance |
|---|---|---|---|---|---|---|---|
| Example 33 | A-16 | 28 | 13 | 11 | 4 | VG | G |
| Example 34 | A-17 | 36 | 14 | 14 | 4 | G | G |
| Comp. Ex. 12 | A-18 | 27 | 18 | 16 | 3 | F | F |
| Comp. Ex. 13 | A-19 | 33 | 13 | 15 | 4.5 | F | F |
| Comp. Ex. 14 | A-20 | 38 | 14 | 15 | 4.5 | F | F |
| Comp. Ex. 15 | A-21 | 38 | 15 | 15 | 4.5 | F | P |
| Comp. Ex. 16 | A-22 | 48 | 18 | 18 | 3.5 | G | G |
| Comp. Ex. 17 | A-23 | 58 | 20 | 21 | 3 | F | P |
| Comp. Ex. 18 | A-24 | 17 | 22 | 18 | 4.5 | VG | G |
| Comp. Ex. 19 | A-25 | 18 | 22 | 16 | 4.5 | VG | F |
| Comp. Ex. 20 | A-26 | 52 | 12 | 13 | 4 | P | P |
| Comp. Ex. 21 | A-27 | 43 | 12 | 9 | 4 | F | F |
| Comp. Ex. 22 | A-28 | 16 | 22 | 18 | 4.5 | VG | G |

(Test Methods)

Coating Film Absorption Percentage (%):

The water-based first pigmented coating material (A) was applied onto an aluminum foil for coating film absorption percentage measurement, and the coating film absorption percentage (%) of the first pigmented coating film was calculated by the test method and formula mentioned above. A smaller coating film absorption percentage indicates less absorption of water into the first pigmented coating film upon coating of the water-based second pigmented coating material (B).

Smoothness:

This was evaluated using the Long Wave (LW) value, measured by a Wave Scan (trade name of BYK Gardner). The Long Wave (LW) value is an index of the amplitude of surface roughness with wavelength of about 600 to 1,000 μm, with a smaller measured value representing higher smoothness of the coating surface.

Distinctness of Image:

This was evaluated using the Short Wave (SW) value, measured by the Wave Scan mentioned above. The Short Wave (SW) value is an index of the amplitude of surface roughness with wavelength of about 100 to 600 μm, with a smaller measured value representing higher distinctness of image of the coating surface.

Flip-Flop Property (FF):

Each test sheet was measured using a MA-68 Multi-Angle Spectrocolorimeter (trade name of X-Rite), determining the L value (brightness) at an acceptance angle of 15° and an acceptance angle of 110°, and calculating the FF value by the following formula.

FF value=L value at acceptance angle of 15°/L value at acceptance angle of 110°

A larger FF value indicates greater variation in the L value (brightness) depending on the observation angle (acceptance angle), and a more excellent flip-flop property.

Water Resistance:

The test sheet was immersed for 240 hours in warm water at 40° C. and then raised and dried at 20° C. for 12 hours, after which the multilayer coating film on the test sheet was notched with a cutter in a lattice-like manner reaching to the basis material, to create 100 square grids with sizes of 2 mm×2 mm. Pressure-sensitive adhesive cellophane tape was then attached to the surface and the tape was abruptly peeled off at 20° C., after which the residual state of the square grid coating film was examined. The evaluation standard for the water resistance was as follows.

VG: 100 of the square grids of the coating film remained, with no chipping of the edges of the square grids.

G: 100 of the square grids of the coating film remained, but with chipping of the edges of the square grids.

F: 90 to 99 of the square grids of the coating film remained.

P: 89 or fewer of the square grids of the coating film remained.

Chipping Resistance:

The test sheet was set on the sample holding stage of a Model JA-400 chipping tester (trade name of Suga Test Instruments Co., Ltd., chipping resistance tester), and 50 g of crushed granite of #7 grain size was impacted onto the test sheet at an angle of 45°, using compressed air at 0.392 MPa (4 kgf/cm$^2$), at −20° C. from a distance of 30 cm. The obtained test sheet was then washed with water and dried, and cloth adhesive tape (product of Nichiban Co., Ltd.) was attached to the coating surface and peeled off, after which the extent of damage in the coating film was visually examined and evaluated by the following standard.

VG: Very small damage size, no exposure of electrodeposition surface or base steel sheet.

G: Small damage size, no exposure of electrodeposition surface or base steel sheet.

F: Small damage size, but some exposure of electrodeposition surface or base steel sheet.

P: Considerable damage size, with exposure of base steel sheet.

What is claimed is:

1. A multilayer coating film-forming method comprising the following steps (1) to (4):
    step (1): a step of coating an article to be coated with a water-based first pigmented coating material (A) to form a first pigmented coating film, wherein the coating film thickness, as dry film thickness, is from 10 to 100 µm,
    step (2): a step of coating the uncured first pigmented coating film formed in step (1) with a water-based second pigmented coating material (B) to form a second pigmented coating film,
    step (3): a step of coating the uncured second pigmented coating film formed in step (2) with a clear coating material (C) to form a clear coating film, and
    step (4): a step of bake curing the multilayer coating film formed in steps (1) to (3),
    wherein the water-based coating composition as the water-based first pigmented coating material (A) comprises 7 to 60 mass % of an acrylic resin emulsion (a), 10 to 60 mass % of a coating film-forming resin (b) and 10 to 50 mass % of a curing agent (c), based on the total mass of the solid resin content in the water-based coating composition,
    the acrylic resin emulsion (a) has a core-shell structure, the core section comprising, as a copolymerizing component, 0.1 to 10 mass % of a polymerizable unsaturated monomer having two or more polymerizable unsaturated groups in the molecule, based on the total mass of the monomers of the core section, and the shell section comprising, as a copolymerizing component, a hydroxyl group-containing polymerizable unsaturated monomer,
    the hydroxyl value of the core section is 50 to 200 mgKOH/g and the hydroxyl value of the shell section is 50 to 200 mgKOH/g, and
    the curing agent (c) comprises a blocked polyisocyanate compound (c2) having a hydrophilic group, wherein the blocked polyisocyanate compound (c2) having a hydrophilic group is a polyisocyanate compound blocked by both an active hydrogen-containing compound having a polyoxyalkylene group and an active methylene compound as blocking agents, and wherein the active hydrogen-containing compound has a number average molecular weight of 300 to 2,000.

2. The method according to claim 1, wherein the core section comprises, as a copolymerizing component, 30 to 90 mass % of a copolymerizable unsaturated monomer with a C4 or greater hydrocarbon group, based on the total mass of the monomers of the core section, the acid value of the acrylic resin emulsion (a) is no greater than 15 mgKOH/g, and its glass transition temperature (Tg) is 20° C. or higher.

3. The method of claim 1, wherein the coating film-forming resin (b) comprises at least one resin selected from the group consisting of: polyester resins (b1), water-soluble acrylic resins (b2) and urethane resins (b3).

4. The method of claim 1, wherein the water-based coating composition includes 5 to 30 mass % of the blocked polyisocyanate compound (c2), based on the total mass of the solid resin content in the water-based coating composition.

5. The method of claim 4, wherein the blocked polyisocyanate compound (c2) comprises at least one blocked isocyanate group selected from the group consisting of:
    blocked isocyanate groups represented by the following formula (I):

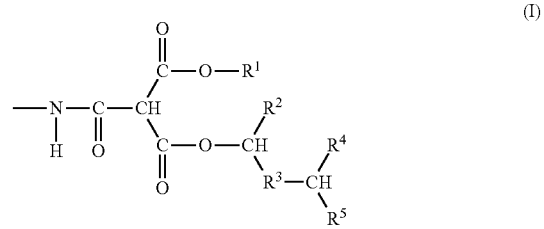

wherein $R^1$, $R^2$, $R^4$ and $R^5$ each independently represent a C1-12 hydrocarbon group and $R^3$ represents a C1-12 straight-chain or branched alkylene group, blocked isocyanate groups represented by the following formula (II):

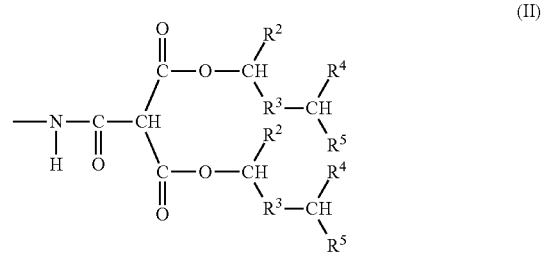

wherein $R^2$, $R^3$, $R^4$ and $R^5$ have the same definitions as above, and blocked isocyanate groups represented by the following formula (III):

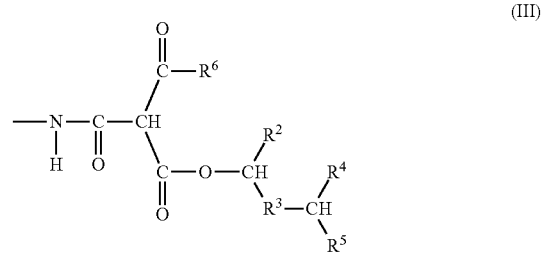

wherein $R^2$, $R^3$, $R^4$ and $R^5$ have the same definitions as above, and $R^6$ represents a C1-12 hydrocarbon group.

6. The method of claim 1, wherein the first pigmented coating film is preheated before application of the water-based second pigmented coating material (B).

* * * * *